US009616453B2

(12) United States Patent
Sakita

(10) Patent No.: US 9,616,453 B2
(45) Date of Patent: Apr. 11, 2017

(54) COATING MIST COLLECTION APPARATUS

(71) Applicant: Taikisha Ltd., Tokyo (JP)

(72) Inventor: Kenji Sakita, Tokyo (JP)

(73) Assignee: Taikisha Ltd., Tokyo (JP)

( * ) Notice: Subject to any disclaimer, the term of this patent is extended or adjusted under 35 U.S.C. 154(b) by 174 days.

(21) Appl. No.: 14/406,702

(22) PCT Filed: Oct. 3, 2014

(86) PCT No.: PCT/JP2014/076497
§ 371 (c)(1),
(2) Date: Dec. 9, 2014

(87) PCT Pub. No.: WO2015/087603
PCT Pub. Date: Jun. 18, 2015

(65) Prior Publication Data
US 2016/0263610 A1 Sep. 15, 2016

(30) Foreign Application Priority Data

Dec. 10, 2013 (JP) .................................. 2013-255144
Jan. 7, 2014 (JP) .................................. 2014-001109

(51) Int. Cl.
*B01D 50/00* (2006.01)
*B05B 15/12* (2006.01)
(Continued)

(52) U.S. Cl.
CPC ...... *B05B 15/1255* (2013.01); *B01D 46/0027* (2013.01); *B01D 46/0041* (2013.01);
(Continued)

(58) Field of Classification Search
CPC ...... B01D 50/00; B01D 50/002; B05B 15/12; B05B 15/1229; Y10S 55/46
(Continued)

(56) References Cited

U.S. PATENT DOCUMENTS 5,040,482 A * 8/1991 McGuire ............ B05B 15/1262
118/326
5,147,422 A * 9/1992 Neeley ................ B05B 15/1262
261/112.1
(Continued)

FOREIGN PATENT DOCUMENTS

DE 4211465 A1 10/1993
JP 53124883 10/1978
(Continued)

*Primary Examiner* — Jacob T Minskey
*Assistant Examiner* — Minh-Chau Pham
(74) *Attorney, Agent, or Firm* — The Webb Law Firm

(57) ABSTRACT

Powder is sprayed uniformly and favorably from a powder nozzle into processing target air. In a coating mist collection apparatus, coating mist in processing target gas is collected by filters in a state in which a coating mist trapping filter covering layer made up of an accumulated layer of powder is formed on the surface of the filters. The coating mist collection apparatus is provided with a powder dispersion means that obtains a uniform powder concentration in the air in sealed powder tanks by dispersing the powder stored in the tanks in a uniform floating dispersed state, and is provided with a spray air conveying means that supplies the powder in the floating dispersed state in the powder tanks along with carrier air to powder nozzles through powder supply passages.

14 Claims, 10 Drawing Sheets

(51) Int. Cl.
*B01D 46/00* (2006.01)
*B01D 46/04* (2006.01)
*B01D 46/42* (2006.01)
*B01D 46/48* (2006.01)
*B05B 7/14* (2006.01)
*B05B 15/00* (2006.01)
*B05B 15/04* (2006.01)

(52) U.S. Cl.
CPC ......... *B01D 46/0068* (2013.01); *B01D 46/04* (2013.01); *B01D 46/42* (2013.01); *B01D 46/48* (2013.01); *B05B 7/1463* (2013.01); *B05B 15/002* (2013.01); *B05B 15/008* (2013.01); *B05B 15/0412* (2013.01); *B05B 15/1229* (2013.01); *B05B 15/1248* (2013.01); *B05B 15/1285* (2013.01); *B01D 2273/12* (2013.01); *B05B 15/1222* (2013.01); *Y02P 70/36* (2015.11)

(58) Field of Classification Search
USPC .......... 55/385.2, 342, DIG. 46; 118/50, 326; 454/50
See application file for complete search history.

(56) References Cited

U.S. PATENT DOCUMENTS

| | | | | |
|---|---|---|---|---|
| 5,153,084 A * | 10/1992 | Foust | ........................ | G03F 1/68 264/271.1 |
| 5,336,283 A * | 8/1994 | Horisawa | ............... | B01D 47/10 55/DIG. 46 |
| 5,692,262 A * | 12/1997 | Haupt | .................... | A01G 1/125 15/339 |
| 5,766,355 A * | 6/1998 | Josefsson | ............ | B05B 15/1222 118/326 |
| 5,782,943 A * | 7/1998 | O'Ryan | .............. | B05B 15/1229 55/332 |
| 6,010,571 A * | 1/2000 | Josefsson | ............ | B05B 15/1222 118/326 |
| 6,228,154 B1 * | 5/2001 | Pakkala | ................. | B01D 47/10 55/DIG. 46 |
| 6,238,451 B1 * | 5/2001 | Conrad | ................... | A47L 9/122 55/323 |
| 6,471,737 B2 * | 10/2002 | Cole | .................... | B01D 50/002 118/326 |
| 8,882,892 B2 * | 11/2014 | Hoversten | ................. | B04C 5/08 55/356 |
| 2010/0197213 A1 | 8/2010 | Holzheimer et al. | | |
| 2012/0266812 A1 | 10/2012 | Iwakiri | | |

FOREIGN PATENT DOCUMENTS

| | | | |
|---|---|---|---|
| JP | 2261733 | A | 10/1990 |
| JP | 10114428 | A | 5/1998 |
| JP | 11114374 | A | 4/1999 |
| JP | 200158117 | A | 3/2001 |
| JP | 200830010 | A | 2/2008 |
| JP | 2010536545 | A | 12/2010 |
| JP | 2013166118 | A | 8/2013 |
| WO | 2011121820 | A1 | 10/2011 |

\* cited by examiner

COATING MIST COLLECTION APPARATUS

CROSS-REFERENCE TO RELATED APPLICATIONS

This application is the United States national phase of International Application No. PCT/JP2014/076497 filed Oct. 3, 2014, and claims priority to Japanese Patent Application Nos. 2013-255144 and 2014-001109, filed Dec. 10, 2013 and Jan. 7, 2014, respectively, the disclosures of which are hereby incorporated in their entirety by reference.

BACKGROUND OF THE INVENTION

Field of the Invention

The present invention relates to a coating mist collection apparatus that collects coating mist contained in processing target air discharged from a coating chamber, and, specifically, relates to a coating mist collection apparatus that includes: a filter that collects coating mist contained in processing target air discharged from a coating chamber; and a powder nozzle that is arranged in an air guiding passage for guiding processing target air to the filter, and sprays a powder into the processing target air passing through the air guiding passage, wherein due to the processing target air that contains the dispersed powder sprayed from the powder nozzle being passed through the filter, the coating mist in the processing target gas is collected by the filter in a state in which a coating mist trapping filter covering layer made up of an accumulated powder layer is formed on the surface of the filter.

Description of Related Art

Patent Document 1 discloses a coating mist collection apparatus in which, in an air guiding passage (7, 8) through which processing target air that contains coating mist and was discharged from a coating chamber (1) is guided to a bag filter (11), a powder (assisting dust) is sprayed from a powder nozzle (26) into the processing target air passing through the air guiding passage (7, 8), and thus the coating mist in the processing target air is collected by the bag filter (11) in a state in which a coating mist trapping filter covering layer made up of an accumulated powder layer is formed on the surface of the bag filter (11) (note that the numbers in parentheses are the reference numerals used in Patent Document 1).

With the conventional coating mist collection apparatus disclosed in Patent Document 1, powder containing the coating mist that falls from the surface of the bag filter (11) during regeneration of the bag filter (11) by so-called reverse air cleaning or the like (i.e., the powder with the mixed coating material that had previously formed the coating mist trapping filter covering layer) is received by a receiving hopper (13) and then sent to a stock hopper (20) by a conveying means (13.1) that includes a conveying rate adjustment function, and then a portion of the powder containing the coating mist received by the stock hopper (20) is retrieved from the stock hopper (20) through a powder discharge passage (27) and sent to a re-processing system.

The powder containing the coating mist remaining in the stock hopper (20) is replenished with a measured amount of fresh powder not containing the coating mist so as to reduce the average coating mist content percentage of the powder overall in the stock hopper (20), and the powder whose coating mist content percentage was reduced in this way is retrieved from the stock hopper (20) through a powder retrieval passage (23) and supplied by force feeding to the powder nozzle (26) through a powder supply passage (25) along with carrier air by a pneumatic conveyor (24).

In other words, with this coating mist collection apparatus, a portion of the powder containing the coating mist that falls from the bag filter (11) is mixed with fresh powder so as to reduce the average coating mist content percentage, and then re-sprayed from the powder nozzle (26) for cyclic usage.

Also, with the coating mist collection apparatus disclosed in Patent Document 1, it has been proposed to keep the powder containing the coating mist in the receiving hopper (13) (i.e., the powder having an increased bridging tendency due to containing the coating mist) in a dissolved state or fluidized state using a pneumatic system, and to keep the powder containing the coating mist in the stock hopper (20) in a dissolved and fluidized state using a fluidizing apparatus.

PRIOR ART DOCUMENTS

Patent Documents

Patent Document 1: German Patent Gazette DE 4211465A1

However, if the powder containing the coating mist in the receiving hopper (13) and in the stock hopper (20) is simply kept in a dissolved and fluidized state as described above, there has been the problem that even if the powder in the fluidized state is force fed to the powder nozzle (26) through the powder supply passage (25) along with carrier air using the pneumatic conveyor (24), unbalance and irregularity tend to occur in the dispersed state of the powder in the carrier air in the powder supply passage (25) (in other words, the concentration of powder in the carrier air), and this causes instability in the spraying of powder from the powder nozzle (26) and a tendency for faults.

There has also been the problem that this causes coating layer formation faults such as the filter surface having locations where the formation of the accumulated powder layer as the coating mist trapping filter covering layer is partially insufficient, which has a tendency to invite a disadvantageous situation in which the coating mist in the processing target air is collected by the filter by adhering directly to the filter surface.

Also, if the amount of powder supplied to the powder nozzle (26) per unit of time is set slightly excessive in order to address this problem such that a large safety factor can be anticipated in the amount of powder sprayed from the powder nozzle (26), the power needed for powder conveying by the pneumatic conveyor (24) increases, and thus there has been the problem of a disadvantage in terms of energy saving.

In light of these circumstances, a main object of the present invention is to effectively solve the aforementioned problems with rational improvements.

SUMMARY OF THE INVENTION

A first characteristic configuration of the present invention relates to a coating mist collection apparatus that includes: a filter that collects coating mist contained in processing target air discharged from a coating chamber; and a powder nozzle that is arranged in an air guiding passage that guides processing target air to the filter, and sprays powder into the processing target air passing through the air guiding passage, due to the processing target air, in which the powder sprayed by the powder nozzle is contained in a dispersed state, being passed through the filter, the coating mist in the processing target gas being collected by the filter in a state in which a coating mist trapping filter covering layer made up of an accumulated powder layer is formed on the surface of the filter, wherein a powder dispersion means is provided for obtaining a uniform powder concentration in air in a sealed powder tank by dispersing powder stored in the tank in a uniform floating dispersed state, and a spray air conveying means is provided for supplying the powder in the floating dispersed state in the powder tank along with carrier air to the powder nozzle through a powder supply passage in parallel with the uniformization of the powder concentration by the powder dispersion means.

According to this configuration, the powder in the sealed powder tank is dispersed in a uniform floating dispersed state (i.e., a state in which the concentration of the powder in the air is made uniform in the tank) by the powder dispersion means rather than the powder simply being dissolved and fluidized. This powder in the floating dispersed state is supplied along with carrier air to the powder nozzle through the powder supply passage by the spray air conveying means. Accordingly, compared to the case where powder that has been simply dissolved and fluidized is supplied along with carrier air to the powder nozzle through the powder supply passage as in the previously described conventional coating mist collection apparatus, it is possible to further effectively obtain a uniform floating dispersed state of the powder in the carrier air (in other words, the concentration of powder in the carrier air) in the powder supply passage connected to the powder nozzle, thus making it possible to uniformly and favorably spray powder from the powder nozzle into the processing target air, and to stably maintain favorable powder spraying.

This also makes it possible to favorably and stably form a uniform accumulated powder layer on the filter surface as the coating mist trapping filter covering layer, and this makes it possible to further effectively prevent a disadvantageous situation in which the coating mist in the processing target air is collected by the filters by adhering directly to the filter surface due to faulty covering layer formation, and makes it possible to obtain a coating mist collection apparatus that is further superior in terms of coating mist collection ability.

Also, this makes it possible to reduce the safety factor anticipated for the amount of powder sprayed from the powder nozzle, and makes it possible to avoid excessively supplying powder to the powder nozzle as previously described, and this makes it possible to reduce the power needed for powder conveying and makes it possible to obtain a coating mist collection apparatus that is superior in terms of energy saving as well.

A second characteristic configuration of the present invention specifies a preferred embodiment of the first characteristic configuration, in which a filter regenerating means is provided for regenerating the filter by causing the powder containing the coating mist to fall from the surface of the filter, and a receiving hopper is provided for receiving the powder containing the coating mist that falls from the surface of the filter, the powder tank is arranged below the receiving hopper in a state in which the interior of the receiving hopper and the interior of the powder tank are in communication with each other through a powder discharge opening formed in a bottom portion of the receiving hopper, and a partition door is provided for opening and closing the powder discharge opening, and due to an opening operation of the partition door, the powder containing the coating mist that has accumulated in the receiving hopper is caused to fall into the powder tank through the powder discharge opening and stored therein, and the powder tank with powder stored therein is sealed by a closing operation of the partition door.

According to this configuration, normally the partition door is put in the closed state and the powder tank is put in the sealed state, thus making it possible for the powder dispersion means to keep the powder in the powder tank in a more uniform dispersed state. This makes it possible to effectively obtain a uniform powder concentration in the carrier air in the powder supply passage connected to the powder nozzle and stably keep a favorable spray of powder from the powder nozzle as previously described. Also, when the filter regeneration means performs filter regeneration at an appropriate time, it is possible for the powder containing the coating mist that falls from the filter surface to be received by and temporarily stored in the receiving hopper during the filter regeneration.

When the amount of the powder in the powder tank decreases to a certain extent, the partition door is opened, and the powder containing the coating mist that accumulated in the receiving hopper while the partition door was closed is caused to fall into the powder tank through the powder discharge opening so as to replenish the powder tank. Thereafter, the partition door is again closed so as to again seal the powder tank, and the supply of powder to the powder nozzle with a uniform powder concentration in the carrier air can be swiftly resumed.

In other words, according to this configuration, the operation of sealing the powder tank and the operation of replenishing the powder tank with powder from the receiving hopper can be performed in a simple manner by merely opening and closing the partition door, thus making it possible to simplify the apparatus configuration and reduce the apparatus cost, and also make the apparatus operation management easier.

A third characteristic configuration of the present invention specifies a preferred embodiment of the second characteristic configuration, in which a discharge air conveying means is provided for discharging the powder containing the coating mist stored in the powder tank from the powder tank along with carrier air through the powder discharge passage, and a fresh powder air conveying means is provided for supplying fresh powder not containing the coating mist along with carrier air to the powder tank through a fresh powder supply passage.

In other words, if the partition door is opened so as to replenish the powder tank with the powder containing the coating mist accumulated in the receiving hopper in order to be re-used over multiple times, the coating mist content percentage of the powder held in the powder circulation system from the powder tank to the receiving hopper gradually increases and intensifies the bridging tendency. The held powder therefore gradually becomes unsuitable for being sprayed from the powder nozzle as powder for filter covering layer formation.

To address this, according to the above configuration, when the coating mist content percentage of the powder held in the powder circulation system from the powder tank to the receiving hopper increases to a certain extent, the partition door is opened so as to cause powder to fall from the receiving hopper, and the powder containing the coating mist stored in the powder tank is discharged from the powder tank along with carrier air through the powder discharge passage by the discharge air conveying means, and fresh powder not containing coating mist is supplied along with carrier air to the powder tank through the fresh powder supply passage by the fresh powder air conveying means, thus making it possible to refresh the powder held in the powder circulation system from the powder tank to the receiving hopper.

Also, due to performing this powder refreshing at appropriate times, it is possible to favorably carry out coating mist collection over a long period in a state in which an accumulated powder layer is formed on the surface of the filters as a coating mist trapping filter covering layer by the spraying of powder from the powder nozzle.

Note that as a specific embodiment of the powder refreshing in the implementation of the above configuration, it is possible to apply a mode in which all of the powder held in the powder circulation system is collectively refreshed at an appropriate time interval, a mode in which the powder held in the powder circulation system is refreshed one portion at a time at an appropriate time interval, or a mode in which powder refreshing is continuously carried out with a limited amount of powder refreshing per unit of time. However, if the mode in which all of the powder held in the powder circulation system is collectively refreshed at an appropriate time interval is applied, it is possible to reduce the frequency at which powder refreshing is carried out, thus making it possible to make apparatus operation management easier by a commensurate amount.

A fourth characteristic configuration of the present invention likewise specifies a preferred embodiment of the second characteristic configuration, in which a discharge air conveying means is provided for discharging the powder containing the coating mist stored in the powder tank from the powder tank along with carrier air through the powder discharge passage, a fresh powder air conveying means is provided for supplying fresh powder not containing the coating mist along with carrier air through a fresh powder supply passage, and a supply passage switching means is provided for switching the supply passage connected to the powder nozzle between the powder supply passage from the powder tank and the fresh powder supply passage.

According to this configuration, when the coating mist content percentage of the powder held in the powder circulation system from the powder tank to the receiving hopper increases to a certain extent, the partition door is opened so as to cause powder to fall from the receiving hopper, and the powder containing the coating mist stored in the powder tank is discharged from the powder tank along with carrier air through the powder discharge passage by the discharge air conveying means, and with the supply passage connected to the powder nozzle being switched to the fresh powder supply passage instead of the powder supply passage from the powder tank, fresh powder not containing coating mist is supplied along with carrier air to the powder nozzle through the fresh powder supply passage by the fresh powder air conveying means and sprayed from the powder nozzle, thus making it possible to refresh the powder held in the powder circulation system from the powder tank to the receiving hopper.

Also, due to performing this powder refreshing at appropriate times, similarly to the case of the third characteristic configuration, it is possible to favorably carry out coating mist collection over a long period in a state in which an accumulated powder layer is formed on the surface of the filters as a coating mist trapping filter covering layer by the spraying of powder from the powder nozzle.

Also, according to this configuration, by setting the partition door to the closed state, powder refreshing for spraying fresh powder from the powder nozzle can be performed in parallel with discharging powder in the powder tank by the discharge air conveying means, and therefore coating mist collection by spraying powder from the powder nozzle during powder refreshing as well can be maintained in a stable state similar to that in a normal case.

Note that as a specific embodiment of the powder refreshing in the implementation of the above configuration, it is possible to apply a mode in which all of the powder held in the powder circulation system is collectively refreshed at an appropriate time interval, or a mode in which the powder held in the powder circulation system is refreshed one portion at a time at an appropriate time interval.

A fifth characteristic configuration of the present invention specifies a preferred embodiment of the third or fourth characteristic configuration, in which a control means is provided for automatically executing powder recovery in which, at a set recovery time interval, the partition door is opened and the accumulated powder containing the coating mist in the receiving hopper is caused to fall into the powder tank, and in addition to executing the powder recovery, the control means automatically executes powder refreshing in which, each time a coating work quantity in the coating chamber reaches a set threshold work quantity, or each time the number of times the partition door has opened reaches a set threshold number of times, the powder containing the coating mist in the powder tank is discharged through the powder discharge passage by the discharge air conveying means, and a predetermined amount of fresh powder is supplied through the fresh powder supply passage by the fresh powder air conveying means.

According to this configuration, the powder recovery and the powder refreshing are each executed automatically by the control means, thus making it possible to make apparatus operation management significantly easier compared to the case where the powder recovery and the powder refreshing are each performed by manual operations.

Also, as a different method of powder refreshing, it is conceivable to use a sensor to measure the powder state, such as the coating mist content percentage or specific gravity of the powder held in the powder circulation system from the powder tank to the receiving hopper, and cause the control means to execute powder refreshing based on the measurement results. However, in view of powder characteristics such as sticking and floating dispersion, it is technically difficult to precisely, stably, and continuously measure the powder state with a sensor, and large measurement error is likely to arise, thus leading to the risk of inviting unforeseen problems in the operation of the apparatus due to large measurement error attributed to these powder characteristics.

To address this, according to the above configuration, instead of performing powder refreshing based on the measurement of the powder state, the control means is caused to execute powder refreshing each time the coating work quantity in the coating chamber reaches the set threshold work quantity, or each time the number of times the partition door has opened reaches the set threshold number of times, thus making it possible to avoid inviting unforeseen problems due to large measurement error attributed to powder characteristics as described above. In this regard, it is possible to obtain a coating mist collection apparatus that is further superior in terms of reliability as well.

A sixth characteristic configuration of the present invention specifies a preferred embodiment of the first characteristic configuration similarly to the second characteristic configuration, in which a filter regenerating means is provided for regenerating the filter by causing the powder containing the coating mist to fall from the surface of the filter, and a receiving hopper is provided for receiving the powder containing the coating mist that falls from the surface of the filter, a reflux air conveying means is provided for returning the powder containing the coating mist accumulated in the receiving hopper along with carrier air to the powder tank through a powder reflux passage, a discharge air conveying means is provided for discharging the powder containing the coating mist stored in the powder tank from the powder tank along with carrier air through the powder discharge passage, and a fresh powder air conveying means is provided for supplying fresh powder not containing the coating mist along with carrier air to the powder tank through a fresh powder supply passage.

According to this configuration, instead of opening the partition door to allow the accumulated powder in the receiving hopper to fall into the powder tank through the powder discharge opening in the bottom portion of the receiving hopper as described above, the powder containing the coating mist accumulated in the receiving hopper is returned to the powder tank along with carrier air through the powder reflux passage by the reflux air conveying means, thus making it possible to always keep the powder tank in a sealed state.

In other words, by always keeping the sealed state, the powder in the powder tank can be kept in the uniform floating dispersed state by the powder dispersion means, thus making it possible to effectively obtain a uniform powder concentration in the carrier air in the powder supply passage connected to the powder nozzle and stably keep favorable spraying of powder from the powder nozzle as described above.

When the amount of powder in the powder tank has decreased to a certain extent, the powder containing the coating mist accumulated in the receiving hopper is returned to the powder tank along with carrier air through the powder reflux passage by the reflux air conveying means, thus making it possible to replenish the powder in the powder tank. This makes it possible to continue the supply of powder to the powder nozzle in a state in which the powder concentration in the carrier air is uniform in the powder supply passage connected to the powder nozzle.

Also, according to this configuration, when the coating mist content percentage of the powder held in the powder circulation system from the powder tank to the receiving hopper increases to a certain extent, the powder containing the coating mist that was returned from the receiving hopper and stored in the powder tank is discharged from the powder tank along with carrier air through the powder discharge passage by the discharge air conveying means, and fresh powder not containing coating mist is supplied along with carrier air to the powder tank through the fresh powder supply passage by the fresh powder air conveying means, thus making it possible to refresh the powder held in the powder circulation system, and due to performing this powder refreshing at appropriate times, it is possible to favorably carry out coating mist collection over a long period by the spraying of powder from the powder nozzle.

In other words, according to this above configuration, even if the powder tank is arranged at an appropriate location away from the receiving hopper, the recovery of powder from the receiving hopper to the powder tank and the refreshing of powder in the powder circulation system from the powder tank to the receiving hopper can be performed, thus making it possible to raise the degree of freedom in selecting the arrangement of the apparatus units, and in this regard, it is possible to obtain a coating mist collection apparatus that is superior in terms of installability and general versatility.

Note that as a specific embodiment of the powder refreshing in the implementation of the above configuration, it is possible to apply a mode in which all of the powder held in the powder circulation system is collectively refreshed at an appropriate time interval, a mode in which the powder held in the powder circulation system is refreshed one portion at a time at an appropriate time interval, or a mode in which powder refreshing is continuously carried out with a limited amount of powder refreshing per unit of time.

A seventh characteristic configuration of the present invention specifies a preferred embodiment of the sixth characteristic configuration, in which a control means is provided for automatically executing powder recovery in which, at a set recovery time interval, the accumulated powder containing the coating mist in the receiving hopper is returned to the powder tank through the powder reflux passage by the reflux air conveying means, and in addition to executing the powder recovery, the control means automatically executes powder refreshing in which, each time a coating work quantity in the coating chamber reaches a set threshold work quantity, or each time the number of times powder has been returned by the reflux air conveying means reaches a set threshold number of times, the powder containing the coating mist in the powder tank is discharged through the powder discharge passage by the discharge air conveying means, and a predetermined amount of fresh powder is supplied to the powder tank through the fresh powder supply passage by the fresh powder air conveying means.

According to this configuration, similarly to the above-described fifth characteristic configuration, the powder recovery and the powder refreshing are each executed automatically by the control means, thus making it possible to make apparatus operation management significantly easier compared to the case where the powder recovery and the powder refreshing are each performed by manual operations.

Also, as a different method of powder refreshing as described above, it is conceivable to use a sensor to measure the powder state, such as the coating mist content percentage or specific gravity of the powder held in the powder circulation system from the powder tank to the receiving hopper, and cause the control means to execute powder refreshing based on the measurement results. However, in view of powder characteristics such as sticking and floating dispersion, it is technically difficult to precisely, stably, and continuously measure the powder state with a sensor, and large measurement error is likely to arise, thus leading to the risk of inviting unforeseen problems in the operation of the apparatus due to large measurement error attributed to these powder characteristics.

To address this, according to the above configuration, instead of performing powder refreshing based on the measurement of the powder state, the control means is caused to execute powder refreshing each time the coating work quantity in the coating chamber reaches the set threshold work quantity, or each time the number of times powder has been returned by the reflux air conveying means reaches the set threshold number of times, thus making it possible to avoid inviting unforeseen problems due to large measurement error attributed to powder characteristics as described above. In this regard, it is possible to obtain a coating mist collection apparatus that is further superior in terms of reliability as well.

An eighth characteristic configuration of the present invention specifies a preferred embodiment of the seventh characteristic configuration, in which when a coating target object processing count in the coating chamber reaches a set threshold processing count, the control means determines that the coating work quantity in the coating chamber has reached the set threshold work quantity, and executes the powder refreshing.

According to this configuration, the timing for executing powder refreshing is determined based on the coating target object processing count, which can be easily measured, thus making it possible to avoid inviting unforeseen problems due to large measurement error attributed to powder characteristics as described above.

A ninth characteristic configuration of the present invention specifies a preferred embodiment of the seventh characteristic configuration, in which the control means sets a powder load value corresponding to a coating target object coating condition in the coating chamber for each coating target object coating task, and integrates the powder load value in the coating target object coating task as coating target objects are successively coated, and when the integrated value of the powder load value has reached a set threshold integrated value, the control means determines that the coating work quantity in the coating chamber has reached the set threshold work quantity, and executes the powder refreshing.

In general, in order to reliably perform coating mist collection, the necessary powder usage amount for coating the coating target object that is to be coated differs depending on the coating conditions for that coating target object (e.g., the type of coating target object, type of coating material, type of coating task, or coating location). However, in general, a constant amount of powder is discharged by a constant rate supply device regardless of the coating condition for the coating target object to be coated in the coating chamber, and in the case of supplying powder to multiple supply destinations, the powder is divided evenly among the supply destinations by a branch line and supplied. Examples of a case where there are multiple coating conditions having different necessary powder usage amounts include the case where multiple types of coating target objects having different necessary powder usage amounts are to be coated in the same coating chamber, the case where multiple types of coating materials having different powder usage amounts are switched in use in the same coating chamber, and the case where the necessary powder usage amount differs according to the supply destinations to which powder is divided and supplied by the branch line from the constant rate supply device. In order to reliably perform coating mist collection in such a case, the powder discharge amount of the constant rate supply device needs to be adjusted according to the powder usage amount for the coating condition having the highest necessary powder usage amount. In this case, the powder usage amount for the coating task with a coating condition having a low necessary powder usage amount will be the same as that for the coating target object having the highest powder usage amount when powder discharge is performed. As a result, the coating material content percentage in the discharged powder in one instance of the coating task (in other words, the degree of contamination of the powder by the coating material) will be different for each coating target object coating task depending on the respective coating conditions.

In this case, if powder refreshing is performed simply each time the coating target object processing count reaches the set threshold processing count without giving consideration to the difference in the necessary powder usage amount for each coating target object coating condition, there is the risk that powder refreshing will be performed when the powder has not reached the maximum powder coating material content percentage, that is to say, powder that is still in a usable state will be discarded, and thus powder will be wasted. There is also the risk that, alternatively, powder refreshing will not be performed even if the powder exceeds the maximum powder coating material content percentage, and coating mist collection will be negatively influenced.

To address this problem, according to the above configuration, the difference in the necessary powder usage amount for each coating condition is used as the powder load value and set for each coating target object coating task, and powder refreshing is executed when the integrated value of the powder load value has reached a set threshold integrated value, thus making it possible to determine whether to perform powder refreshing with consideration given to the difference in the necessary powder usage amount for each coating condition. This makes it possible to accurately perform powder refreshing when the powder has reached the maximum powder coating material content percentage, thus making it possible to effectively avoid the wasting of powder and negative influence on coating mist collection.

A tenth characteristic configuration of the present invention specifies a preferred embodiment of the ninth characteristic configuration, in which the control means sets the powder load value based on any one of the type of coating target object, the type of coating material used on the coating target object, the type of coating task performed on the coating target object, and the coating target object coating location, or a combination of two or more of any of these.

According to this configuration, the determination of whether to perform powder refreshing is made with consideration given to the type of coating target object, the type of coating material to be used on the coating target object, the type of coating task to be performed on the coating target object, or the coating target object coating location, which have a large influence on the powder usage amount needed in the coating target object coating task. This makes it possible to more accurately perform powder refreshing at the timing when the powder has reached the maximum powder coating material content percentage, thus making it possible to further effectively avoid the wasting of powder and negative influence on coating mist collection.

An eleventh characteristic configuration of the present invention specifies a preferred embodiment of the sixth to tenth characteristic configurations, in which a plurality of coating mist collection units are provided that each include the filter, the powder nozzle, and the receiving hopper, and the powder tank that is provided is common to the plurality of coating mist collection units, and each of the coating mist collection units is provided with the spray air conveying means for supplying powder from the common powder tank to the powder nozzle through the powder supply passage and the reflux air conveying means for returning the powder containing the coating mist from the receiving hopper to the common powder tank through the powder reflux passage.

According to this configuration, a mode is applied in which a powder tank common to multiple coating mist collection units is provided, powder is supplied from the common powder tank to the powder nozzles of the coating mist collection units, and powder containing the coating mist is returned from the receiving hoppers of the coating mist collection units to the common powder tank. Accordingly, compared to the case of providing a separate powder tank for each of the coating mist collection units, it is possible to simplify the apparatus configuration as a whole and reduce the apparatus cost, and it is possible to make the apparatus operation management easier as well.

A twelfth characteristic configuration of the present invention specifies a preferred embodiment of any of the first to eleventh characteristic configurations, in which an air diffusion plate formed by an air-permeable material that allows the passage of pressurized air is arranged in a bottom portion of the powder tank, due to the air diffusion plate, the interior of the powder tank is partitioned into an upper powder storage chamber in which powder is stored and a lower pressurized air chamber that receives a supply of pressurized agitating air, and an agitating nozzle is provided for ejecting agitating air into the powder storage chamber, and using the air diffusion plate and the agitating nozzle as the powder dispersion means, agitating air is ejected upward from the pressurized air chamber toward the powder storage chamber through the air diffusion plate, and agitating air is ejected from the agitating nozzle into the powder storage chamber such that the powder stored in the powder storage chamber is dispersed in a uniform floating dispersed state.

According to this configuration, it is possible to cause the powder in the powder storage chamber to rise and float in a dispersed state using agitating air that passes through the air diffusion plate and is ejected upward toward the powder storage chamber, and it is possible to convectively agitate the interior air of the powder storage chamber using agitating air ejected from the agitating nozzle into the powder storage chamber and thus convectively agitate the powder in the powder storage chamber. The combination of these things makes it possible to effectively disperse the powder in the powder storage chamber in a uniform floating dispersed state, and makes it possible to stably keep the uniform floating dispersed state.

A thirteenth characteristic configuration of the present invention specifies a preferred embodiment of the twelfth characteristic configuration, in which a powder delivery chamber is provided adjacent to the powder storage chamber in the powder tank, and the powder supply passage extends from the powder delivery chamber, and the partition wall that divides the powder storage chamber and the powder delivery chamber is provided with a diaphragm opening that, as a connecting opening for putting the powder storage chamber and the powder delivery chamber in communication, limits the amount of inflow of powder flowing from the powder storage chamber to the powder delivery chamber in the floating dispersed state.

According to this configuration, the floating dispersed state of the powder in the powder storage chamber can be stabilized by the air-flow resistance provided by the diaphragm opening, and the inflow of powder in the floating dispersed state from the powder storage chamber into the powder delivery chamber can also be stabilized, thus making it possible to further effectively stabilize the supply of powder from the powder delivery chamber to the powder nozzle through the powder supply passage, and making it possible to further effectively stabilize the spraying of powder from the powder nozzle.

A fourteenth characteristic configuration of the present invention specifies a preferred embodiment of any of the first to thirteenth characteristic configurations, in which the spray air conveying means that supplies powder from the powder tank to the powder nozzle through the powder supply passage is configured by an ejector that sucks in powder from the powder tank using negative pressure obtained along with the passage of supplied compressed air, and then using the compressed air resulting from negative pressure as carrier air, supplies the sucked in powder along with the compressed air resulting from negative pressure, and a spray amount adjustment means is provided for, by adjusting the amount of compressed air supplied to the ejector, adjusting the amount of powder supplied to the powder nozzle and adjusting the spray amount of powder sprayed from the powder nozzle.

According to this configuration, powder is sucked in from the powder tank by the ejector using negative pressure obtained by the compressed air in the ejector, and the sucked-in powder is supplied along with the compressed air resulting from negative pressure (carrier air) from the ejector to the powder nozzle through the powder supply passage. Accordingly, as another mode of conveying air, compared to simply using compressed air to push powder in the powder tank from the powder tank to the powder supply passage for force feeding to the powder nozzle, it is possible for the powder in the floating dispersed state in the powder tank to be retrieved from the powder tank further smoothly and stably, thus making it possible to further effectively stabilize the supply of powder to the powder nozzle.

Also, by adjusting the amount of powder sprayed from the powder nozzle using the ejector, the adjustment of the powder spray amount can be performed smoothly and stably.

DETAILED DESCRIPTION OF THE INVENTION

Figure 1:
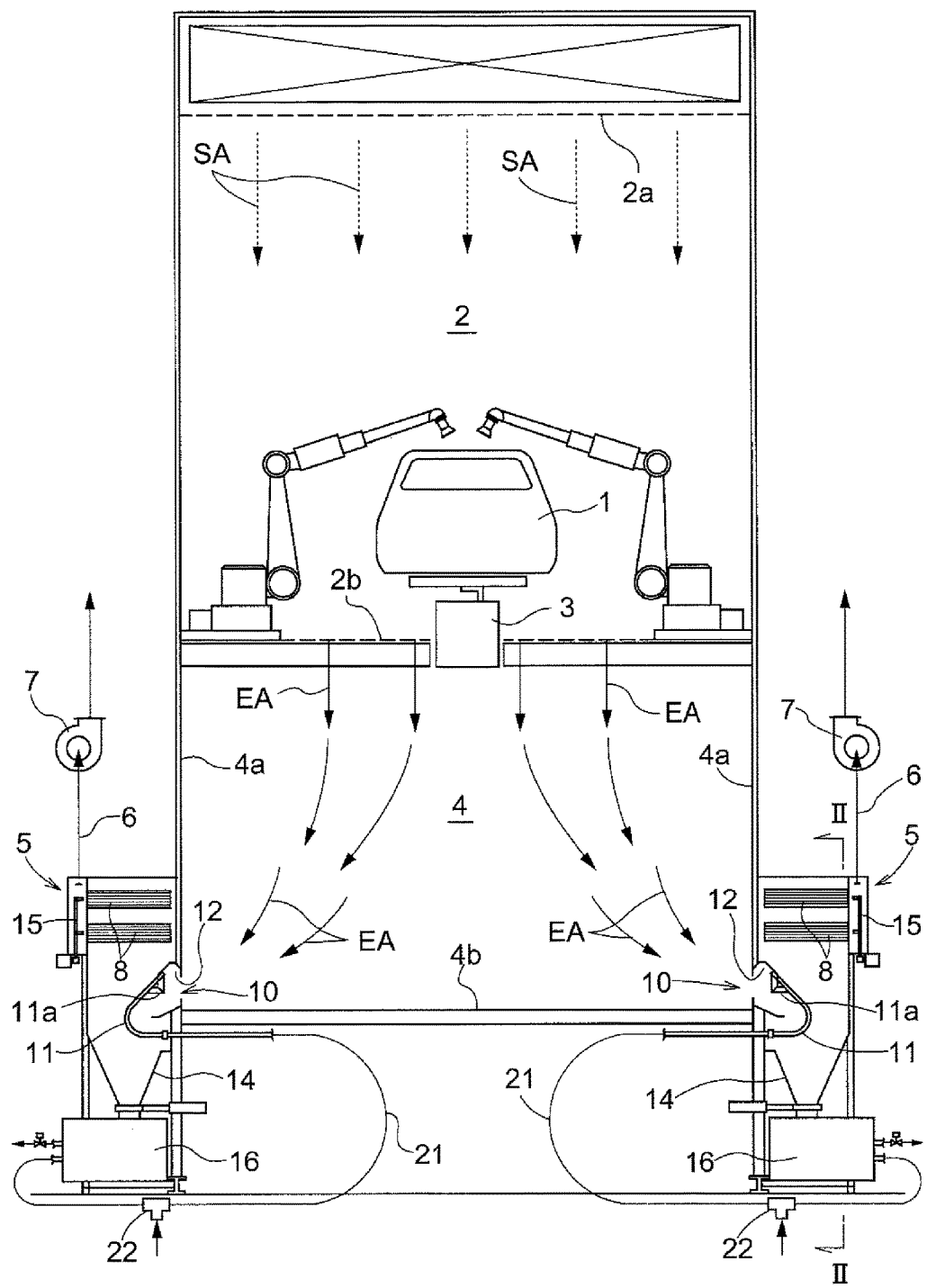
FIG. 1 is a lateral cross-sectional view of a coating booth.

The coating chamber 2 has a tunnel-shaped interior space that extends in the conveying direction of the coating target object 1 (the depth direction in FIG. 1), and ventilation air SA that has been subjected to temperature and humidity adjustment is supplied from a ceiling portion 2a over the entirety of the tunnel-shaped space of the coating chamber 2.

An exhaust chamber 4 that extends in the conveying direction of the coating target object 1 likewise to the coating chamber 2 is formed below the coating chamber 2, and this exhaust chamber 4 receives processing target air EA (air that contains floating coating mist produced by over-spraying in the coating chamber 2) that is discharged downward from the coating chamber 2 through a perforated floor 2b along with the supply of the ventilation air SA into the coating chamber 2.

In other words, as the ventilation air SA is supplied from the ceiling portion 2a of the coating chamber 2, the interior air EA in the coating chamber 2 is discharged toward the exhaust chamber 4 therebelow in a piston flow manner, and thus the floating coating mist produced in the coating chamber 2 is swiftly expelled from the coating chamber 2 along with the interior air EA, thereby keeping a high quality of coating for the coating target object 1 and keeping a favorable work environment in the coating chamber 2.

Figure 2:
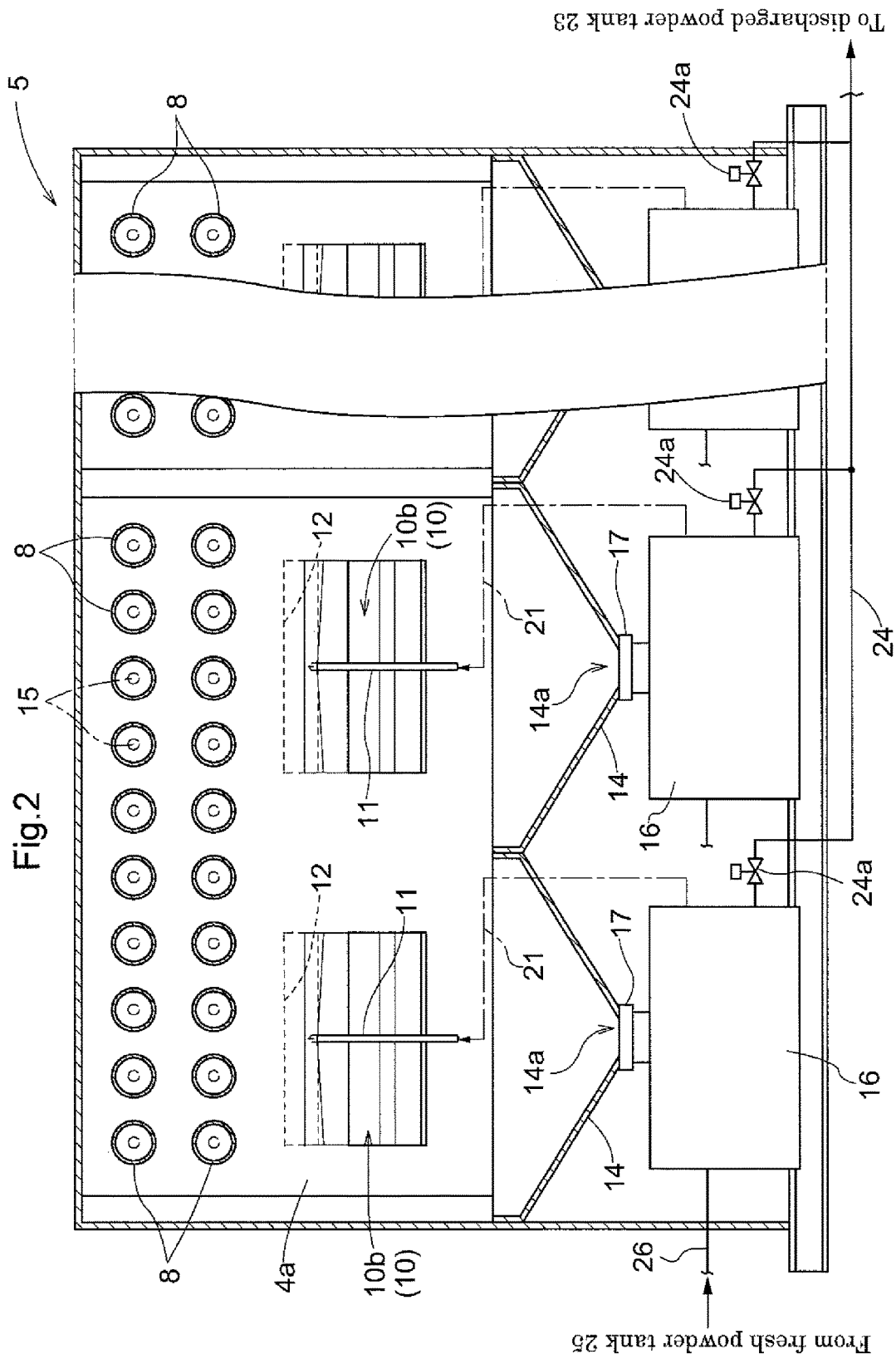
FIG. 2 is a cross-sectional view taken along II-II in FIG. 1.

As shown in FIGS. 1 and 2, multiple filter apparatuses 5 are arranged in a line along the lengthwise direction of the coating booth, which is the conveying direction of the coating target object 1, on each of the two lateral outer sides of the exhaust chamber 4. When the processing target air EA containing the coating mist that is discharged from the coating chamber 2 and flows into the exhaust chamber 4 passes through these filter apparatuses 5, the coating mist contained in the processing target air EA is collected by the filter apparatuses 5, thus cleaning the processing target air EA.

The processing target air EA cleaned by the filter apparatuses 5 (i.e., the processed clean air) is then discharged to the outside by an exhaust fan 7 through an exhaust duct 6 connected to the filter apparatuses 5 (or returned to the coating chamber 2 through an air conditioner as the ventilation air SA).

In each of the filter apparatuses 5, multiple tubular filters 8 are arranged in parallel in a lateral orientation, and two inlets 10, which are shaped as laterally elongated rectangles and serve as air guiding passages through which processing target air EA containing the coating mist is introduced from the exhaust chamber 4 to the filter apparatus 5 and guided to the filters 8, are formed in the filter apparatus 5, specifically in a side wall 4a of the exhaust chamber 4 that also serves as an apparatus wall of the filter apparatus 5.

In other words, due to suction force applied by the exhaust fan 7 through the exhaust duct 6 connected to the upper portions of the filter apparatuses 5, processing target air EA containing the coating mist is caused to flow from the exhaust chamber 4 to the filter apparatuses 5 through the pairs of inlets 10 and is passed through the filters 8, and thus the coating mist in the processing target air EA is collected by the filters 8.

Meanwhile, in order to avoid a situation in which the filters 8 become unusable in a short time due to the coating mist in the processing target air EA adhering to the surface of the filters 8 in the coating mist collection, each of the inlets 10 in each of the filter apparatuses 5 is equipped with a powder nozzle 11 that sprays powder P for filter covering layer formation into the processing target air EA that passes through the inlet 10.

In other words, the powder P for filter covering layer is dispersed into the processing target air EA by powder spraying performed by the powder nozzle 11, and due to passing this processing target air EA with the dispersed powder through the filters 8, a coating mist trapping filter covering layer made up of an accumulated layer of the powder P is formed on the surface of the filters 8, and the coating mist in the processing target air EA is collected by the filters 8 in a state in which the filter covering layer is caused to trap the coating mist.

Then, when the content percentage of trapped coating mist in the accumulated powder layer serving as the filter covering layer rises to a certain extent in the coating mist collection, filter regeneration processing is performed to cause the accumulated powder layer to fall from the surface of the filters 8, and then after regeneration, a filter covering layer made up of the accumulated powder layer is again formed on the surface of the filters 8 by the powder nozzles 11 spraying powder into the processing target air EA, and thus the coating mist collection operation for collecting the coating mist in the processing target air EA with the filters 8 continues.

The inlets 10 in the filter apparatuses 5, which are arranged in a line in the lengthwise direction of the booth, are formed in the lower end portion of each of the two side walls 4a of the exhaust chamber 4 so as to be aligned in a single line in the lengthwise direction of the booth, and therefore the processing target air EA flowing downward into the exhaust chamber 4 from the coating chamber 2 is mainly divided into two streams in the horizontal width direction of the booth. Then, while keeping a uniform airflow state in the lengthwise direction of the booth, these two streams of processing target air EA flow diagonally in the exhaust chamber 4 toward the inlets 10 located in the lower end portion of each of the two side walls 4a of the exhaust chamber 4, and ultimately the processing target air EA is evenly divided into streams and sucked into the inlets 10 of each of the filter apparatuses 5 in the vicinity of a bottom wall 4b of the exhaust chamber 4.

Figure 3:
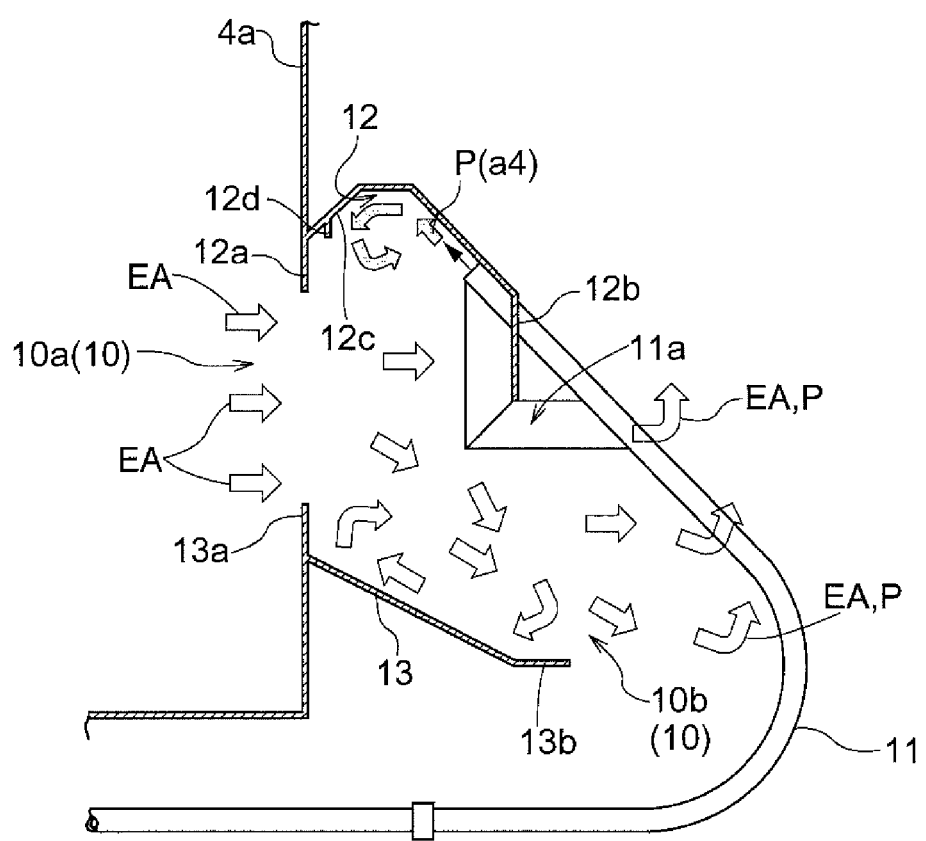
FIG. 3 is an enlarged cross-sectional view of an inlet.

As shown in FIG. 3, in each of the filter apparatuses 5, an accumulation receding portion 12, which has a cross-sectional shape that is open downward, is formed in an upper wall portion of each of the inlets 10, and this accumulation receding portion 12 is formed over the entire width of the corresponding inlet 10 so as to be continuous in the horizontal width direction of the inlet 10 (i.e., the lengthwise direction of the booth).

More specifically, in each of the inlets 10, the edge portion upstream of the accumulation receding portion 12 in the passing direction of the processing target air EA is a vertically-oriented upstream hanging wall 12a connected to the side wall 4a of the exhaust chamber 4, and similarly the edge portion downstream of the accumulation receding portion 12 is a vertically-oriented downstream hanging wall 12b.

Also, an inclined bottom 13 that opposes the accumulation receding portion 12 in the upper wall portion and decreases in height as it extends downstream in the passing direction of the processing target air EA in the inlet 10 is formed in the lower wall portion of the inlet 10, and this inclined bottom 13 is also formed over the entire width of the corresponding inlet 10 so as to be continuous in the horizontal width direction of the inlet 10.

Also, the edge portion upstream of the inclined bottom 13 in the passing direction of the processing target air EA in the inlet 10 is a vertically-oriented upstream rising wall 13a that rises toward the upstream hanging wall 12a of the accumulation receding portion 12.

Each of the inlets 10 is given an overall cornered tube structure made up of the accumulation receding portion 12 in the upper wall portion, the inclined bottom 13 in the lower wall portion, and two side wall portions. The region between the upstream hanging wall 12a of the accumulation receding portion 12 and the upstream rising wall 13a of the inclined bottom 13 located therebelow is an upstream opening 10a of the cornered tube structure, and the region between the downstream hanging wall 12b of the accumulation receding portion 12 and the downstream edge portion 13b of the inclined bottom 13 located therebelow is a downstream opening 10b of the cornered tube structure.

Also, in the cornered tube structure of the inlet 10, the downstream hanging wall 12b is arranged at a lower position than the upstream hanging wall 12a, and therefore the downstream opening 10b of the cornered tube structure is located at a lower position than the upstream opening 10a.

In the inlets 10 having this cornered tube structure, the powder nozzles 11 are arranged so as to spray the powder P along with carrier air a4 from a central location in the horizontal width direction, which is the lengthwise direction of the inlets 10, toward the rearward inner surface of the accumulation receding portion 12.

In other words, in a situation in which a stream of processing target air EA in the inlet 10 passes in the vicinity of the downward opening of the accumulation receding portion 12, the powder nozzle 11 sprays the powder P along with the carrier air a4 toward the rearward inner surface of the accumulation receding portion 12 as described above, thus causing the swirling accumulation of an air stream containing the powder P to occur in the accumulation receding portion 12 for an appropriate time period.

The powder P is diffused in the horizontal width direction of the inlet 10 in the accumulation receding portion 12 as the powder is agitated due to the swirling accumulation, and the diffused powder P is gradually incorporated into the throughflow of the processing target air EA in the inlet 10 through the downward opening of the accumulation receding portion 12, and thus the powder P sprayed from the powder nozzle 11 is added to the processing target air EA in a uniformly dispersed manner in the horizontal width direction of the inlet 10.

Also, the diffused powder P in the accumulation receding portion 12 is guided downward along with the air stream by the upstream hanging wall 12*a* and the downstream hanging wall 12*b* of the accumulation receding portion 12, and thus the powder P is added to the processing target air EA in an effectively dispersed manner in the height direction (short side direction) of the inlet 10 as well.

Furthermore, the direction of the throughflow of the processing target air EA in the inlet 10 is changed to a moderately inclined downward direction by the downward flow formed by the guidance of the downstream hanging wall 12*b*, and a portion of the powder P contained in the throughflow of the processing target air EA is caused to reach the downstream portion of the inclined bottom 13. That powder P is kept in a state of being dispersed above the inclined bottom 13 due to swirling accumulation occurring above the inclined bottom 13 due to the influence of the upstream rising wall 13*a*, thus preventing the coating mist from affixing to the inclined bottom 13 due to a powder layer forming on the inclined bottom 13 as well.

Also, due to positioning the downstream opening 10*b* lower than the upstream opening 10*a* in the cornered tube structure of the inlet 10 as described above, the processing target air EA that passed through the inlet 10 in an inclined downward direction undergoes a large change from the inclined downward direction to an upward direction so as to become directed toward the filters 8 above, and this further promotes the diffusion of the powder P in the processing target air EA.

Note that 11*a* denotes a diffusion assisting member that is shaped as a triangular plate and attached to the powder nozzle 11. Due to providing this diffusion assisting member 11*a*, the processing target air EA passing through the inlet 10 and the swirling accumulated air that contains the powder P in the accumulation receding portion 12 are divided into streams while undergoing a change in direction to one side and the other side in the horizontal width direction of the inlet 10. This change in direction of the processing target air EA and the swirling accumulated air accompanying this division into streams further promotes the diffusion of the powder P in the horizontal width direction of the inlet in the accumulation receding portion 12, and also promotes the diffusion of the powder P in the process in which the powder P is incorporated from the accumulation receding portion 12 into the throughflow of the processing target air EA.

Also, an upstream inclined wall surface 12*c* that forms the upstream upper bottom portion of the accumulation receding portion 12 is provided with a diffusion assisting projection 12*d* that projects downward into the accumulation receding portion 12 at a location in the vicinity of the upstream hanging wall 12*a*. When effectively generating the swirling accumulation in the upstream portion of the accumulation receding portion 12 as described above, a portion of the carrier air a4 and the powder P sprayed from the powder nozzle 11 is caused to collide with the diffusion assisting projection 12*d* under the guidance of the upstream inclined bottom wall surface 12*c*, thereby facilitating the diffusion of the powder P in the horizontal width direction of the inlet, and this even more effectively promotes the diffusion of the powder P in the horizontal width direction of the inlet in the accumulation receding portion 12 that accompanies agitation by swirling accumulation.

As shown in FIGS. 2 and 4, inside each of the filter apparatuses 5, in the apparatus bottom portion that is below the filters 8 and lower than the downstream opening 10*b* of the inlet 10, two receiving hoppers 14 shaped as inverted cones are arranged so as to be aligned in the lengthwise direction of the booth and respectively oppose the two inlets 10, and a powder discharge opening 14*a* is formed in the bottom portion of each of the two receiving hoppers 14.

Also, each of the filter apparatuses 5 is equipped with a filter regeneration apparatus 15 that blows pulses of compressed air onto the filters 8 in the direction opposite to the passing direction of the processing target air EA in order to perform reverse air cleaning, and this filter regeneration apparatus 15 is operated at appropriate times in order to perform the previously described filter regeneration processing for regenerating the filters 8 by causing the accumulated powder layer that is the filter covering layer in which the coating mist content percentage increased to a certain extent to fall from the surface of the filters.

When this filter regeneration processing is performed, the accumulated powder layer containing the coating mist (i.e., the powder P containing the coating mist) that falls from the surface of the filters 8 is received by the receiving hoppers 14 below the filters.

A powder tank 16 is connected to the bottom of each of the receiving hoppers 14 such that the powder P containing the coating mist that was received by the receiving hoppers 14 falls into the tank through the powder discharge opening 14*a* in the bottom portion of the receiving hopper. Also, a horizontally oriented partition door 17 that opens and closes the powder discharge opening 14*a* is provided between the receiving hopper 14 and the powder tank 16. When this partition door 17 opens, the powder P containing the coating mist that was received by the receiving hopper 14 falls into the powder tank 16 so as to be recovered in the tank, and when the partition door 17 closes, the powder tank 16 with powder stored therein is sealed.

An air diffusion plate 18, which is formed by an air-permeable material that allows the passage of pressurized air due to the existence of a dense arrangement of micro-pores, is arranged in the bottom portion of the powder tank 16 so as to extend over the entirety of the powder tank 16 in a plan view. Due to the air diffusion plate 18, the interior of the powder tank 16 is partitioned into a lower pressurized air chamber 16a that receives a supply of pressurized agitating air a1 through an air passageway, and an upper powder storage chamber 16b that is put in communication with the receiving hopper 14 through the powder discharge opening 14a when the partition door 17 opens.

Also, a powder delivery chamber 16c that is adjacent to the powder storage chamber 16b on the upper side of the pressurized air chamber 16a is formed in the powder tank 16. A lower end portion of a partition wall 19 that partitions the powder storage chamber 16b and the powder delivery chamber 16c is provided with a diaphragm opening 19a that, as a connecting opening for putting the powder storage chamber 16b and the powder delivery chamber 16c in communication, uses air-flow resistance to limit the amount of inflow of the powder P flowing in along with air from the powder storage chamber 16a to the powder delivery chamber 16c.

Also, the powder storage chamber 16b and the powder delivery chamber 16c are respectively equipped with agitating nozzles 20a and 20b that eject agitating air a2 and a3 supplied through an air passageway into the respective chambers.

In other words, in the powder storage chamber 16b of the powder tank 16, agitating air a1 is ejected upward from the pressurized air chamber 16a toward the powder storage chamber 16b through the air diffusion plate 18 such that the powder P stored in the powder storage chamber 16b rises in a dispersed state and floats in the chamber, and agitating air a2 is ejected from the agitating nozzle 20a so as to convectively agitate the interior air and convectively agitate the floating powder P in the powder storage chamber 16b. Accordingly, in the powder tank 16 sealed due to the closing of the partition door 17, the powder P in the powder storage chamber 16b is kept in a uniform floating dispersed state (i.e., a state in which the concentration of the powder in the air is made uniform in the powder storage chamber 16b) rather than simply being in a dissolved fluidized state.

The powder P in the floating dispersed state in the powder storage chamber 16b is sent out of the tank through the diaphragm opening 19a of the partition wall 19 and the powder delivery chamber 16c, and at this time, due to the air-flow resistance of the diaphragm opening 19a, the uniform floating dispersed state of the powder P in the powder storage chamber 16b is kept stable, and the powder P in the floating dispersed state is caused to stably flow from the powder storage chamber 16b into the powder delivery chamber 16c.

Also, the powder P in the powder delivery chamber 16c as well is kept in a uniform floating dispersed state due to agitating air a1 ejected upward from the air diffusion plate 18 and agitating air a3 ejected from the agitating nozzle 20b in the powder delivery chamber 16c.

In other words, the air diffusion plate 18 and the agitating nozzles 20a and 20b in the powder tank 16 configure a powder dispersion means for obtaining a uniform powder concentration in the air in the tank by dispersing the powder P in the sealed powder tank 16 in a uniform floating dispersed state.

Powder supply passages 21 that supply the powder P for filter covering layer formation to the powder nozzles 11 extend from the powder delivery chamber 16c of the powder tank 16 and are connected to the corresponding powder nozzles 11, thus forming a powder circulation system for each inlet 10 of each filter apparatus 5 in which the powder nozzle 11, the receiving hopper 14, the powder tank 16, and the powder supply passage 21 are connected in the stated order.

The powder supply passage 21 connected to the powder nozzle 11 is provided with an ejector 22 as an ejection air conveying means that sucks in the powder P in the powder storage chamber 16b of the powder tank 16 through the powder delivery chamber 16c due to negative pressure obtained along with the passage of the compressed air a4 supplied through an air passageway, and then using the compressed air a4 as the carrier air, supplies the sucked in powder P along with the carrier air a4 to the powder nozzle 11 through the powder supply passage 21. The powder nozzle 11 then sprays the powder P supplied from the ejector 22 along with the carrier air a4 into the processing target air EA in the inlet 10.

Also, by adjusting the flow rate of the compressed air a4 supplied to the ejector 22 and adjusting the flow rate of the powder P supplied to the powder nozzle 11, the spray amount per unit of time of the powder P sprayed from the powder nozzle 11 is adjusted according to the air volume of the processing target air EA, the concentration of the coating mist in the processing target air EA, and the like.

In other words, in order to supply the powder P for filter covering layer formation to the powder nozzle 11, the powder P in the powder tank 16 is put into a uniform floating dispersed state as described above, and the powder P in the floating dispersed state is supplied along with the carrier air a4 by the ejector 22 to the powder nozzle 11 through the powder supply passage 21. Accordingly, the floating dispersed state of the powder P in the carrier air in the powder supply passage 21 (in other words, the concentration of the powder in the carrier air) is effectively made uniform, thereby making it possible to uniformly and favorably spray powder from the powder nozzle 11 into the processing target air EA, and keep this favorable spraying of powder stable.

When the remaining amount of the powder P in the powder tank 16 decreases to a certain extent, the partition door 17 is opened, and the powder P containing the coating mist that accumulated in the receiving hopper 14 due to the filter regeneration processing while the partition door 17 was closed is caused to fall into the powder storage chamber 16b of the powder tank 16 so as to be recovered. After this recovery, the partition door 17 is again closed, the powder P in the powder storage chamber 16b is put in the uniform floating dispersed state with the powder tank 16 in the sealed state, and the powder P in the floating dispersed state is supplied to the powder nozzle 11 through the powder supply passage 21 and sprayed into the processing target air EA. Accordingly, the powder P is repeatedly used while being circulated between the powder nozzle 11, the receiving hopper 14, the powder tank 16, and the powder supply passage 21 in the stated order.

Figure 4:
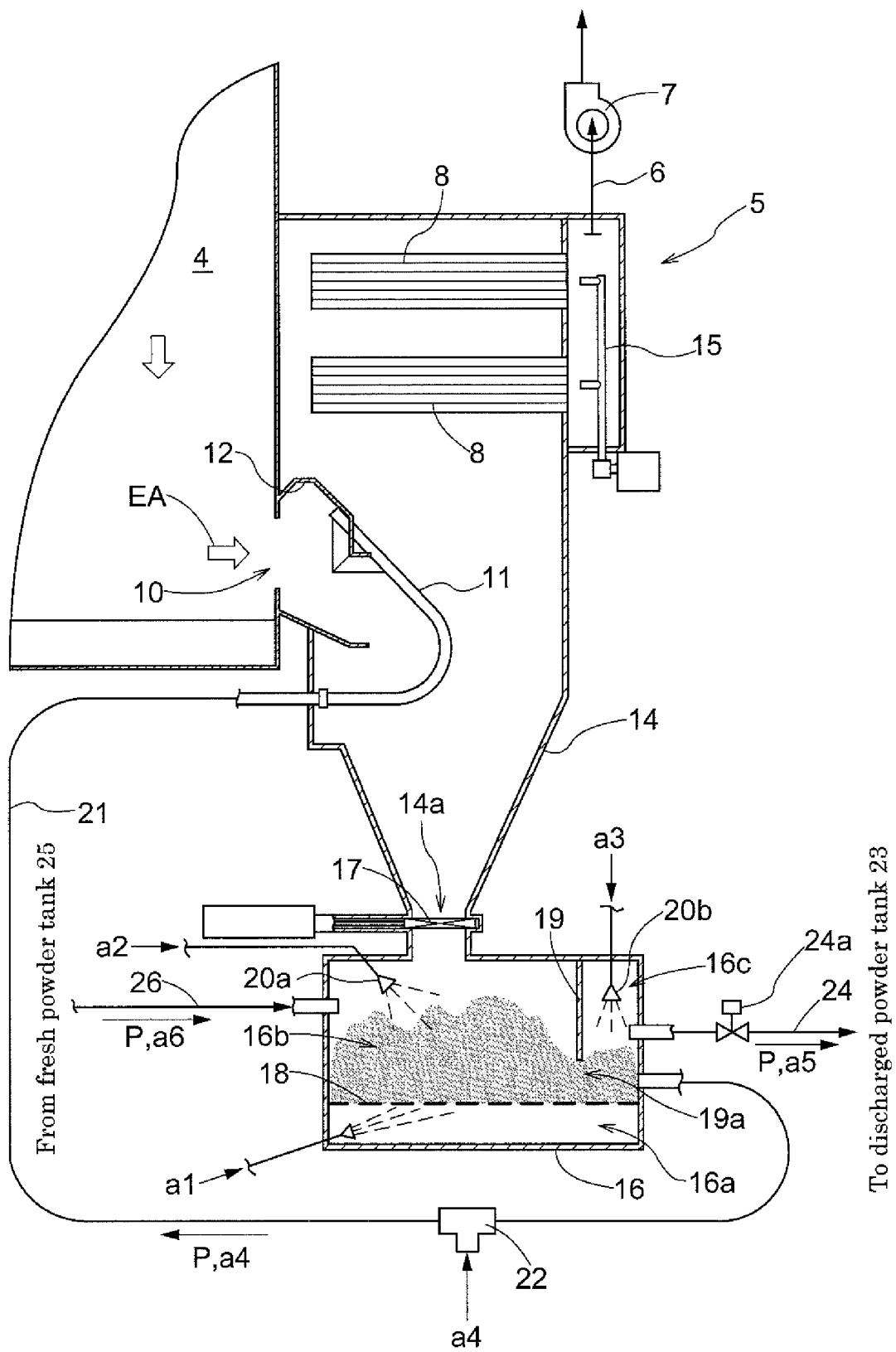
FIG. 4 is a diagram showing a circulation pathway of powder in a first embodiment.
Figure 5:
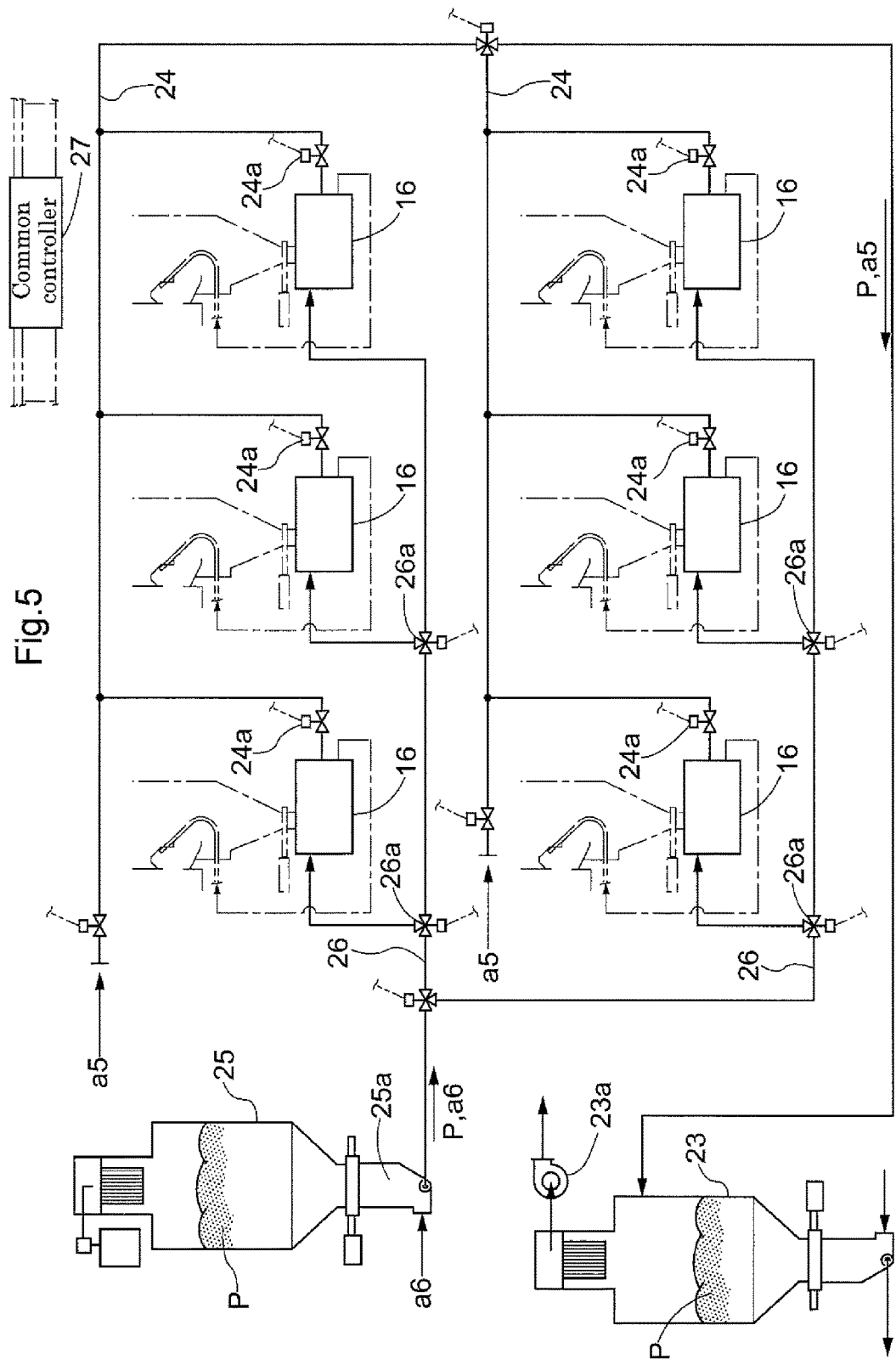
FIG. 5 is a diagram showing a conveyance pathway of fresh powder and discharged powder in the first embodiment.
Figure 6:
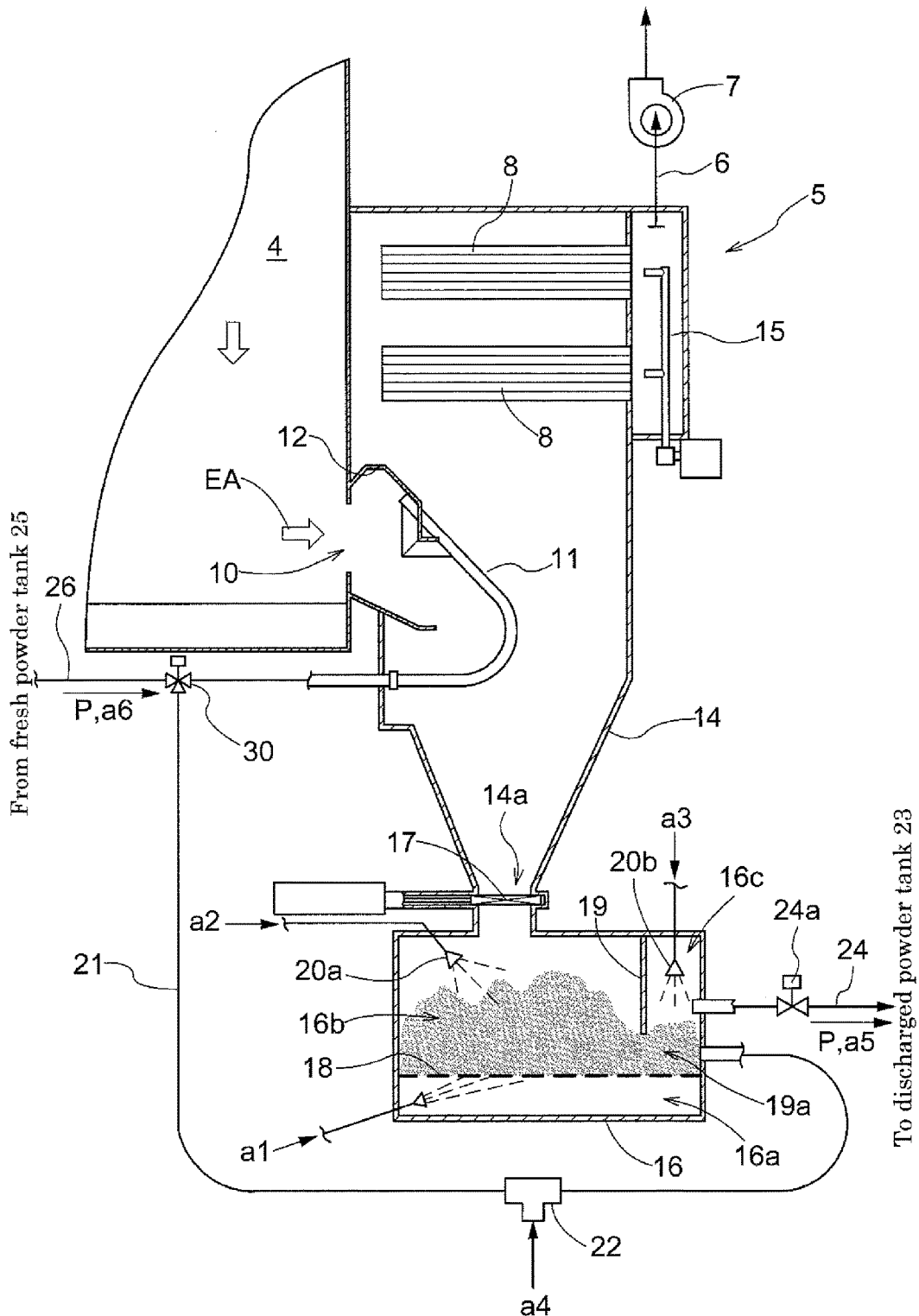
FIG. 6 is a diagram showing a circulation pathway of powder in a second embodiment.

As shown in FIGS. 4 and 5, a powder discharge passage 24, which is connected to the powder supply passage 21 connected to the powder nozzle 11 and is for guiding the powder P containing the coating mist in the powder storage chamber 16b of the powder tank 16 to a common discharged powder tank 23, is connected to the powder delivery chamber 16c of the powder tank 16 in each of the filter apparatuses 5. The discharged powder tank 23 is equipped with a suction fan 23a as a discharge air conveying means for discharging the powder P containing the coating mist from the powder tanks 16 of the filter apparatuses 5 along with the carrier air a5 through the powder discharge passages 24.

Note that the powder discharge passages 24 may be directly connected to the powder storage chambers 16*b* instead of being connected to the powder delivery chambers 16*c*.

Also, fresh powder supply passages 26 for guiding fresh powder P not containing the coating mist from a common fresh powder tank 25 to the powder storage chamber 16*b* are connected to the powder storage chambers 16*b* of the powder tanks 16 of the filter apparatuses 5. The fresh powder tank 25 is equipped with a blow tank 25*a* as a fresh powder air conveying means for, using compressed air supplied through an air passageway as carrier air a6, supplying fresh powder P along with the carrier air a6 to the powder tanks 16 of the filter apparatuses 5 through the fresh powder supply passage 26.

The powder discharge passage 24 is equipped with a powder-discharge-side switching valve 24*a* for switching the powder tank 16 into which powder is to be discharged, and the fresh powder supply passage 26 is equipped with a fresh-powder-side switching valve 26*a* for switching the powder tank 16 into which fresh powder is to be supplied.

27 indicates a controller that is common to the filter apparatuses 5, and this common controller 27 executes the following control from (a) to (c).

(a) Filter Regeneration Control

For each of the filter apparatuses 5, at a set regeneration time interval Ts (or each time the measured air-flow resistance of the filters 8 reaches a set threshold resistance value), the filters 8 are regenerated by operating the filter regeneration apparatus 15 so as to cause the filter covering layer containing the coating mist (accumulated powder layer) to fall from the surface of the filters.

This filter regeneration is carried out while keeping the partition doors 17 of the corresponding powder tanks 16 closed, and the powder P containing the coating mist (accumulated powder layer) that falls from the filters 8 is received by the corresponding receiving hoppers 14 and accumulates therein.

(b) Powder Recovery Control

For each of the filter apparatuses 5, at a set recovery time interval Tk (≥Ts), the partition door 17 is opened, and the accumulated powder P containing the coating mist in the receiving hopper 14 is caused to fall into the powder storage chamber 16*b* of the powder tank 16 and stored therein.

Note that the set recovery time interval Tk is set in advance as the time period required for almost all of the powder P recovered in the powder tank 16 due to the opening of the partition door 17 one time to be used up due to the spraying of the powder from the corresponding powder nozzle 11.

(c) Powder Refresh Control

For each of the filter apparatuses 5, each time the coating work quantity in a corresponding region in the coating chamber 2 reaches a set threshold work quantity, such as the coating target object 1 processing count in a corresponding region in the coating chamber 2 reaching a set threshold processing count, (or each time the number of times that the partition door 17 has opened reaches a set threshold number of times), the partition door 17 is opened and the accumulated powder P in the receiving hopper 14 is caused to fall into the powder tank 16. Thereafter, the powder-discharge-side switching valve 24*a* performs the switching operation in the powder discharge passage 24 while the partition door 17 is closed so as to switch the corresponding powder tank 16 to the powder tank into which powder is to be discharged. Accordingly, all of the powder P containing the coating mist in the corresponding powder tank 16 is discharged along with the carrier air a5 into the discharged powder tank 23 through the powder discharge passage 24.

Then, after all of the powder P has been discharged, the fresh-powder-side switching valve 26*a* in the fresh powder supply passage 26 performs the switching operation so as to switch the corresponding powder tank 16 to the powder tank to which fresh powder is to be supplied, and thus a predetermined amount of fresh powder P is supplied from the fresh powder tank 25 along with carrier air a6 to the powder storage chamber 16*b* of the corresponding powder tank 16 through the fresh powder supply passage 26.

In other words, due to this powder refreshing, the coating mist content percentage of the powder P held in the powder circulation system from the powder tanks 16 to the receiving hoppers 14 is maintained at or below an upper limit value in the formation of the filter covering layer by the spraying of powder from the powder nozzles 11 in the filter apparatuses 5.

Specifically, in the first embodiment, the fresh powder supply passage 26 from the fresh powder tank 25 is connected to the powder tank 16, whereas in the second embodiment, the supply passage connected to the powder nozzle 11 is configured such that a three-way valve 30 serving as a supply passage switching means selectively switches between the powder supply passage 21 from the powder tank 16 and the fresh powder supply passage 26 from the fresh powder tank 25.

In other words, with the coating mist collection apparatus of the second embodiment, when powder refreshing is performed, all of the powder P containing the coating mist in the powder tank 16 is discharged along with the carrier air a5 through the powder discharge passage 24, and the three-way valve 30 performs the switching operation so as to switch the supply passage connected to the powder nozzle 11 to the fresh powder supply passage 26 from the fresh powder tank 25. Fresh powder P supplied from the fresh powder tank 25 is then supplied along with carrier air a6 to the powder nozzle 11 through the fresh powder supply passage 26 and sprayed from the powder nozzle 11 into the processing target air EA. Accordingly, powder refreshing is performed by supplying a predetermined amount of fresh powder P to the powder circulation system from the powder tank 16 to the receiving hopper 14.

Also, with the coating mist collection apparatus of the second embodiment, due to employing this fresh powder supply mode, all of the powder P containing the coating mist in the powder tank 16 is discharged along with carrier air a5 through the powder discharge passage 24 while the partition door 17 is closed, and powder refreshing can be performed in parallel with this by continuing the spraying of fresh powder P from the powder nozzle 11 at the same time. Accordingly, coating mist collection by spraying powder from the powder nozzle 11 during powder refreshing as well can be maintained in a stable state similar to that in a normal case.

Specifically, in the coating mist collection apparatus of the second embodiment, the common controller 27 performs the following control operations (a) and (b) for filter regeneration control and powder recovery control similarly to the coating mist collection apparatus of the first embodiment, and performs the following control operation (c') for powder refresh control.

(a) Filter Regeneration Control

For each of the filter apparatuses 5, at a set regeneration time interval Ts (or each time the measured air-flow resistance of the filters 8 reaches a set threshold resistance value), the filters 8 are regenerated by operating the filter regeneration apparatus 15 so as to cause the filter covering layer containing the coating mist (accumulated powder layer) to fall from the surface of the filters.

This filter regeneration is carried out while keeping the partition doors 17 of the corresponding powder tanks 16 closed, and the powder P containing the coating mist (accumulated powder layer) that falls from the filters 8 is received by the corresponding receiving hoppers 14 and accumulates therein.

(b) Powder Recovery Control

For each of the filter apparatuses 5, at a set recovery time interval Tk (≥Ts), the partition door 17 is opened, and the accumulated powder P containing the coating mist in the receiving hopper 14 is caused to fall into the powder storage chamber 16b of the powder tank 16 and stored therein.

Note that the set recovery time interval Tk is set in advance as the time period required for almost all of the powder P recovered in the powder tank 16 due to the opening of the partition door 17 one time to be used up due to the spraying of the powder from the corresponding powder nozzle 11.

(c') Powder Refresh Control

For each of the filter apparatuses 5, each time the coating work quantity in a corresponding region in the coating chamber 2 reaches a set threshold work quantity, such as the coating target object 1 processing count in a corresponding region in the coating chamber 2 reaching a set threshold processing count, (or each time the number of times that the partition door 17 has opened reaches a set threshold number of times), the partition door 17 is opened and the accumulated powder P in the receiving hopper 14 is caused to fall into the powder tank 16. Thereafter, the powder-discharge-side switching valve 24a performs the switching operation in the powder discharge passage 24 while the partition door 17 is closed so as to switch the corresponding powder tank 16 to the powder tank into which powder is to be discharged. Accordingly, all of the powder P containing the coating mist in the corresponding powder tank 16 is discharged along with the carrier air a5 into the discharged powder tank 23 through the powder discharge passage 24.

Also, in parallel with this discharge of all of the powder P, the three-way valve 30 performs the switching operation such that the supply passage connected to the corresponding powder nozzle 11 is switched to the fresh powder supply passage 26 from the fresh powder tank 25, and the fresh-powder-side switching valve 26a in the fresh powder supply passage 26 performs the switching operation so as to switch the corresponding powder nozzle 11 to the powder nozzle targeted for fresh powder supply. Accordingly, a predetermined amount of fresh powder P is supplied from the fresh powder tank 25 along with carrier air a6 to the corresponding powder nozzle 11 through the fresh powder supply passage 26, and the fresh powder P is sprayed along with the carrier air a6 from the corresponding powder nozzle 11 into the processing target air EA, and thus the coating mist collection operation is continued while performing powder refreshing.

Thereafter, during the filter regeneration control and powder recovery control stages, the three-way valve 30 performs the switching operation such that the supply passage connected to the corresponding powder nozzle 11 is switched to the powder supply passage 21 from the corresponding powder tank 16 so as to revert to the normal coating mist collection operation in which the powder P is cycled through the powder tank 16, the powder nozzle 11, and the receiving hopper 14 in the stated order.

Note that with the coating mist collection apparatus of the second embodiment, fresh powder P retrieved from the fresh powder tank 25 through a rotatory valve 25b is supplied along with carrier air a6 to the powder nozzles 11 through the fresh powder supply passage 26 by a pneumatic blower 25c. Other aspects are the same as in the coating mist collection apparatus of the first embodiment.

Specifically, in the first and second embodiments, the filter apparatuses 5 are coating mist collection units each including filters 8, powder nozzles 11, and receiving hoppers 14, and separate powder tanks 16 are respectively connected to the receiving hoppers 14, whereas in the third embodiment, a common powder tank 16A is provided for the filter apparatuses 5, and the common powder tank 16A is disposed at an appropriate location separate from the filter apparatuses 5.

The powder nozzles 11 of each of the filter apparatuses 5 arranged in a line in the lengthwise direction of the coating booth are connected to separate powder supply passages 21 extending from the common powder tank 16A, and an ejector 22, which is a spray air conveying means, is provided in each of the powder supply passages 21.

Also, the receiving hoppers 14 of each of the filter apparatuses 5 are provided with separate powder reflux passages 31 that guide the accumulated powder P in the receiving hoppers 14 to the common powder tank 16A, whereas the common powder tank 16A is equipped with a vacuum apparatus 32, which is a reflux air conveying means that returns the accumulated powder P in the receiving hoppers 14 along with carrier air a7 to the common powder tank 16A through the powder reflux passages 31, and the powder reflux passages 31 are each provided with a reflux switching valve 31a for selecting the receiving hopper 14 targeted for powder reflux.

The air diffusion plate 18, which is formed by an air-permeable material that allows the passage of pressurized air due to the existence of a dense arrangement of micro-pores, is arranged in the bottom portion of the common powder tank 16A so as to extend over the entirety of the common powder tank 16A in a plan view. Due to the air diffusion plate 18, the interior of the common powder tank 16A is partitioned into the lower pressurized air chamber 16a that receives a supply of pressurized agitating air a1 through an air passageway, and the upper powder storage chamber 16b that stores returned powder P that has returned from the receiving hoppers 14 due to being sucked by the vacuum apparatus 32. Also, the powder storage chamber 16b is equipped with the agitating nozzle 20a that ejects agitating air a2 supplied through an air passageway into the chamber.

In other words, similarly to the powder tanks 16 of the first and second embodiments, in the powder storage chamber 16b of the common powder tank 16A, agitating air a1 is ejected upward from the pressurized air chamber 16a toward the powder storage chamber 16b through the air diffusion plate 18 such that the powder P stored in the powder storage chamber 16b rises in a dispersed state and floats in the chamber, and agitating air a2 is ejected from the agitating nozzle 20a so as to convectively agitate the interior air and convectively agitate the floating powder P in the powder storage chamber 16b. Accordingly, in the common powder tank 16A that is normally sealed, the powder P in the powder storage chamber 16b is kept in a uniform floating dispersed state (i.e., a state in which the concentration of the powder in the air is made uniform in the powder storage chamber 16b) rather than simply being in a dissolved fluidized state.

In other words, in the coating mist collection apparatus of the third embodiment as well, similarly to the coating mist collection apparatuses of the first and second embodiments, in order to supply the powder P for filter covering layer formation to the powder nozzles 11 of the filter apparatuses 5, the powder P in the common powder tank 16A is put into a uniform floating dispersed state as described above, and the powder P in the floating dispersed state is supplied along with the carrier air a4 by the ejectors 22 to the powder nozzles 11 through the powder supply passages 21. Accordingly, the floating dispersed state of the powder P in the carrier air in the powder supply passages 21 (in other words, the concentration of the powder in the carrier air) is effectively made uniform, thereby making it possible to uniformly and favorably spray powder from the powder nozzles 11 into the processing target air EA, and keep this favorable spraying of powder stable.

The powder storage chamber 16b of the common powder tank 16A is connected to the powder supply passages 21 leading to the respective powder nozzles 11, and is connected to the powder discharge passage 24 that guides the powder P containing the coating mist in the powder storage chamber 16b to a common discharged powder tank 23. The discharged powder tank 23 is equipped with a suction fan 23a as a discharge air conveying means for discharging the powder P containing the coating mist from the powder storage chamber 16b of the common powder tank 16A along with the carrier air a5 through the powder discharge passage 24.

Also, a fresh powder supply passage 26 for guiding fresh powder P not containing the coating mist from the common fresh powder tank 25 to the powder storage chamber 16b is connected to the powder storage chamber 16b of the common powder tank 16A. The fresh powder tank 25 is equipped with the blow tank 25a as a fresh powder air conveying means for, using compressed air supplied through an air passageway as carrier air a6, supplying fresh powder P along with the carrier air a6 to the powder storage chamber 16b of the common powder tank 16A through the fresh powder supply passages 26.

The common controller 27 of the coating mist collection apparatus of the third embodiment executes the following control (d) to (f).

(d) Filter Regeneration Control

For each of the filter apparatuses 5, at a set regeneration time interval Ts (or each time the measured air-flow resistance of the filters 8 reaches a set threshold resistance value), the filters 8 are regenerated by operating the filter regeneration apparatus 15 so as to cause the filter covering layer containing the coating mist (accumulated powder layer) to fall from the surface of the filters.

The powder P containing the coating mist (accumulated powder layer) that falls from the filters 8 is received by the corresponding receiving hoppers 14 and accumulates therein.

(e) Powder Recovery Control

While the receiving hoppers 14 of the filter apparatuses 5 are successively set as the receiving hopper targeted for powder reflux due to the opening and closing operations of the reflux switching valve 31a, at a set recovery time interval Tk ($\geq$Ts), the accumulated powder P containing the coating mist in the receiving hoppers 14 of the filter apparatuses 5 is recovered along with the carrier air a7 in the powder storage chamber 16b of the common powder tank 16A through the corresponding powder reflux passages 31.

(f) Powder Refresh Control

For each of the filter apparatuses 5, each time the coating work quantity in a corresponding region in the coating chamber 2 (here, the corresponding region for the multiple filter apparatuses 5 that commonly use one common powder tank 16A) reaches a set threshold work quantity, such as the coating target object 1 processing count in a corresponding region in the coating chamber 2 reaching a set threshold processing count, (or each time the number of times that powder has returned from the receiving hoppers 14 reaches a set threshold number of times), all of the powder P containing the coating mist in the common powder tank 16 is discharged along with the carrier air a5 into the discharged powder tank 23 through the powder discharge passage 24.

Then, after all of the powder P has been discharged, a predetermined amount of fresh powder P is supplied from the fresh powder tank 25 along with carrier air a6 to the powder storage chamber 16b of the common powder tank 16 through the fresh powder supply passage 26.

In other words, due to this powder refreshing, the coating mist content percentage of the powder P circulated between the common powder tank 16A, the powder nozzles 11, and the receiving hoppers 14 in the stated order is maintained at or below an upper limit value in the formation of the filter covering layer by the spraying of powder from the powder nozzles 11 in the filter apparatuses 5.

Note that in the coating mist collection apparatus of the third embodiment, the inclined side walls of the receiving hoppers 14 of the filter apparatuses 5 are equipped with bridge breakers 33 for generating vibration using compressed air a8 supplied through an air passageway, and transmitting the generated vibration to the inclined side walls of the receiving hoppers 14.

In other words, when the accumulated powder P in the receiving hoppers 14 is returned to the common powder tank 16A through the powder reflux passages 31, due to the vibrating operation of the bridge breakers 33, the accumulated powder P in the receiving hoppers 14 is reliably caused to slide/fall to the bottom portion of the receiving hoppers 14 (i.e., the opening portion at the entrance to the powder reflux passages 31).

Other aspects are the same as in the coating mist collection apparatuses of the first and second embodiments.

The filter apparatus 5 is not limited to the case where multiple filters 8 are internally provided in a lateral orientation, and one or more filters 8 may be internally provided in a vertical orientation or oblique orientation.

The locations where the powder nozzles 11 are arranged are not limited to being at the inlets 10 of the filter apparatus 5, and they may be arranged any location in the air guiding passage that guides processing target air EA discharged from the coating chamber 2 to the filters 8.

The powder dispersion means for obtaining a uniform powder concentration in the air in the tank by dispersing the powder P stored in the sealed powder tanks 16 and 16A in a uniform floating dispersed state is not limited to the air diffusion plate 18 and the agitating nozzles 20a and 20b described in the above embodiments. Any of various systems may be employed as long as it is possible to disperse the powder P in the tank in a uniform floating dispersed state.

The spray air conveying means for supplying the powder P in a floating dispersed state in the powder tanks 16 and 16A along with the carrier air a4 to the powder nozzles 11 through the powder supply passages 21 is not limited to the ejector 22, and any of various air conveying systems can be employed.

The filter regenerating means for regenerating the filters 8 by causing the powder P containing the coating mist to fall from the surface of the filters 8 may be any regenerating system, such as a system that blows pulses of compressed air onto the filters 8 in the direction opposite to the passing direction of the processing target air EA, or a system that mechanically applies vibration to the filters 8.

The discharge air conveying means for discharging the powder P containing the coating mist stored in the powder tank 16 or 16A from the powder tank 16 or 16A along with the carrier air a5 through the powder discharge passages 24, and the fresh powder air conveying means for supplying fresh powder P not containing the coating mist along with the carrier air a6 to the powder tank 16 or 16A or the powder nozzles 11 through the fresh powder supply passages 26 are not limited to the systems described in the above embodiments, and various types of air conveying systems can be employed.

Also, the reflux air conveying means that returns the accumulated powder P containing the coating mist in the receiving hoppers 14 along with carrier air a7 to the powder tank 16A through the powder reflux passages 31 is not limited to the system described in the above third embodiment, and various types of conveying systems can be employed.

The above embodiments describe the case in which the coating mist contained in the processing target air EA discharged from the coating chamber 2 is divided between and collected by multiple filter apparatuses 5 arranged in a line, but the present invention is applicable to the case where the coating mist contained in the processing target air EA discharged from the coating chamber 2 is collected by one filter apparatus 5.

The coating target object 1 to be coated in the coating chamber 2 is not limited to being an automobile body, and may be anything such as an automobile part (e.g., a bumper), the body of a railway vehicle or airplane, a household appliance, or a steel product.

In the above embodiments, in the case where powder refreshing is performed each time the coating work quantity in a corresponding region in the coating chamber 2 reaches a set threshold work quantity, a configuration is possible in which a powder load value corresponding to a coating target object 1 coating condition in the coating chamber 2 is set for each coating target object 1 coating task, the powder load value is integrated in the coating target object 1 coating task as the coating target objects 1 are successively coated, and when the integrated value of the powder load value has reached a set threshold integrated value, it is determined that the coating work quantity in the coating chamber has reached the set threshold work quantity, and powder refreshing is executed.

Here, examples of the coating condition include the type of coating target object 1 (automobile body, bumper, door part, or the like), coating type (coating manufacturer, color, type (e.g., middle coat, upper coat, or clear), or the like), coating task type (inner panel coating, outer panel coating, corrective coating), and the coating location (under a coating robot having a large coating load, near the entrance/exit of a coating booth having a small coating load, or the like).

In general, in order to reliably perform coating mist collection, the necessary powder usage amount for coating the coating target object that is to be coated differs depending on the coating conditions for that coating target object. If, as described above, the difference in the necessary powder usage amount for each coating condition is used as the powder load value and set for each coating target object coating task, and powder refreshing is executed when the integrated value of the powder load value has reached the set threshold integrated value, it is possible to determine whether to perform powder refreshing with consideration given to the difference in the necessary powder usage amount for each coating condition. This makes it possible to accurately perform powder refreshing when the powder has reached the maximum powder coating material content percentage.

The following describes the timing of powder refreshing taking into consideration the difference in the necessary powder usage amount for each coating condition, taking the example of a case in which coating is performed on two types of coating target objects A and B using two types of coating materials C and D as the coating conditions. Note that in this case, there are four types of coating tasks, namely the coating task for coating the coating target object A with the coating material C (called A:C below), the coating task for coating the coating target object A with the coating material D (called A:D below), the coating task for coating the coating target object B with the coating material C (called B:C below), and the coating task for coating the coating target object B with the coating material D (called B:D below).

The processing count at which the powder reached the maximum powder coating material content percentage was as shown below in the various coating tasks.

A:C→100 pieces
A:D→70 pieces
B:C→80 pieces
B:D→56 pieces

The powder load value was as shown below in the various coating tasks.

A:C→1/100
A:D→1/70
B:C→1/80
B:D→1/56

Let the coating target object processing count in the various coating tasks be as shown below.

A:C processing count→X pieces
A:D processing count→Y pieces
B:C processing count→Z pieces
B:D processing count→W pieces Assume that powder refresh control was performed when X/100+Y/70+Z/80+W/56>1. Note that in the above conditional expression, the left member (X/100+Y/70+Z/80+W/56) is the integrated value of the powder load value, and the right member (1) is the set threshold integrated value.

Although the example where powder refresh control is performed in the case where coating is performed using two types of coating target objects A and B and two types of coating materials C and D as the coating conditions is used here for simplification, there is no limitation to this. The coating condition may be any one of the type of coating target object, the type of coating material used on the coating target object, the type of coating task performed on the coating target object, and the coating target object coating location, or a combination of two or more of any of them, and in this case, the powder load value may be set for each coating task under the set coating condition. Also, the conditional expression and set threshold integrated value used when making the powder refreshing determination are not limited to the above description, and may be set as appropriate.

Figure 7:
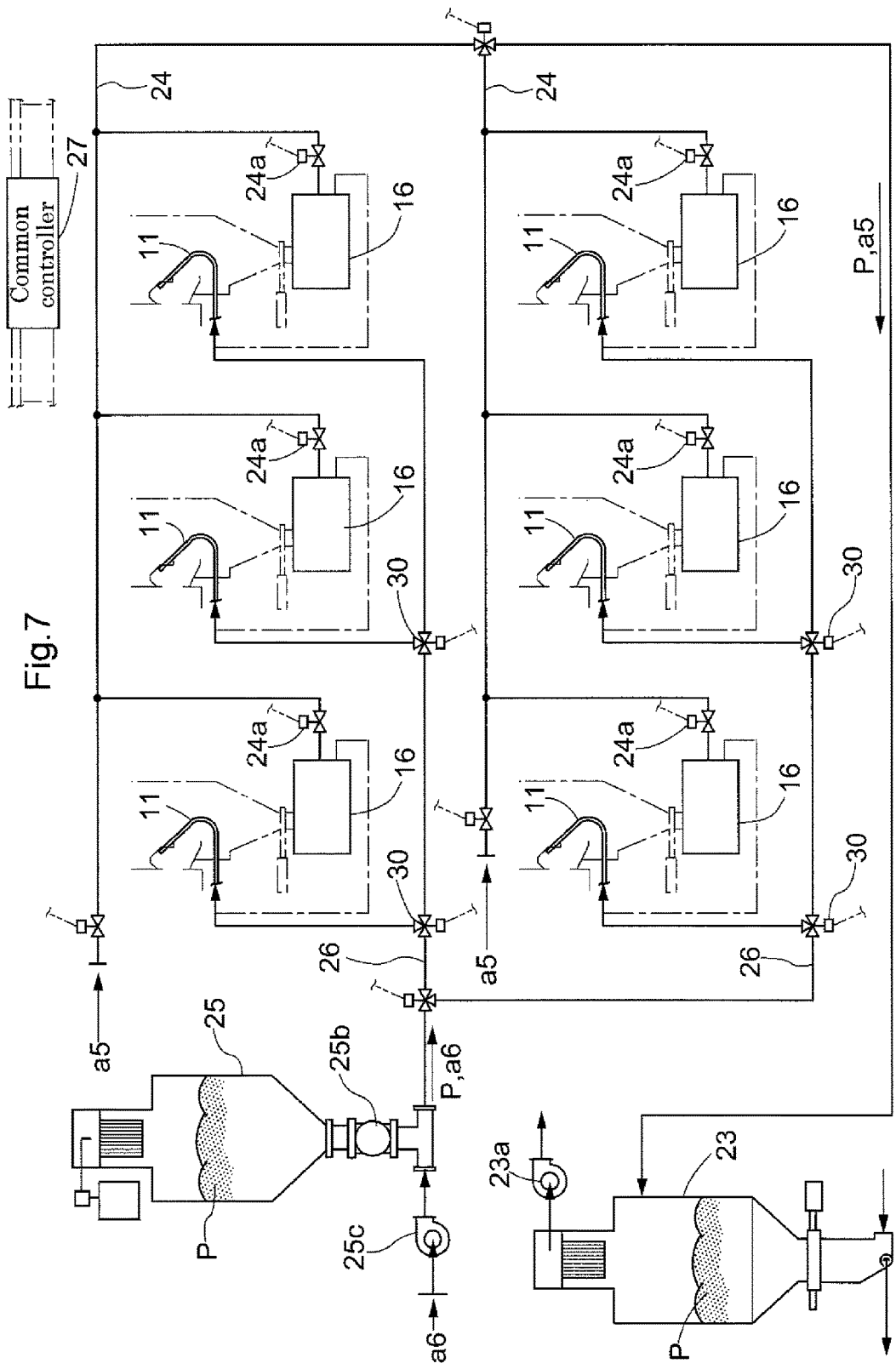
FIG. 7 is a diagram showing a conveyance pathway of fresh powder and discharged powder in the second embodiment.
Figure 8:
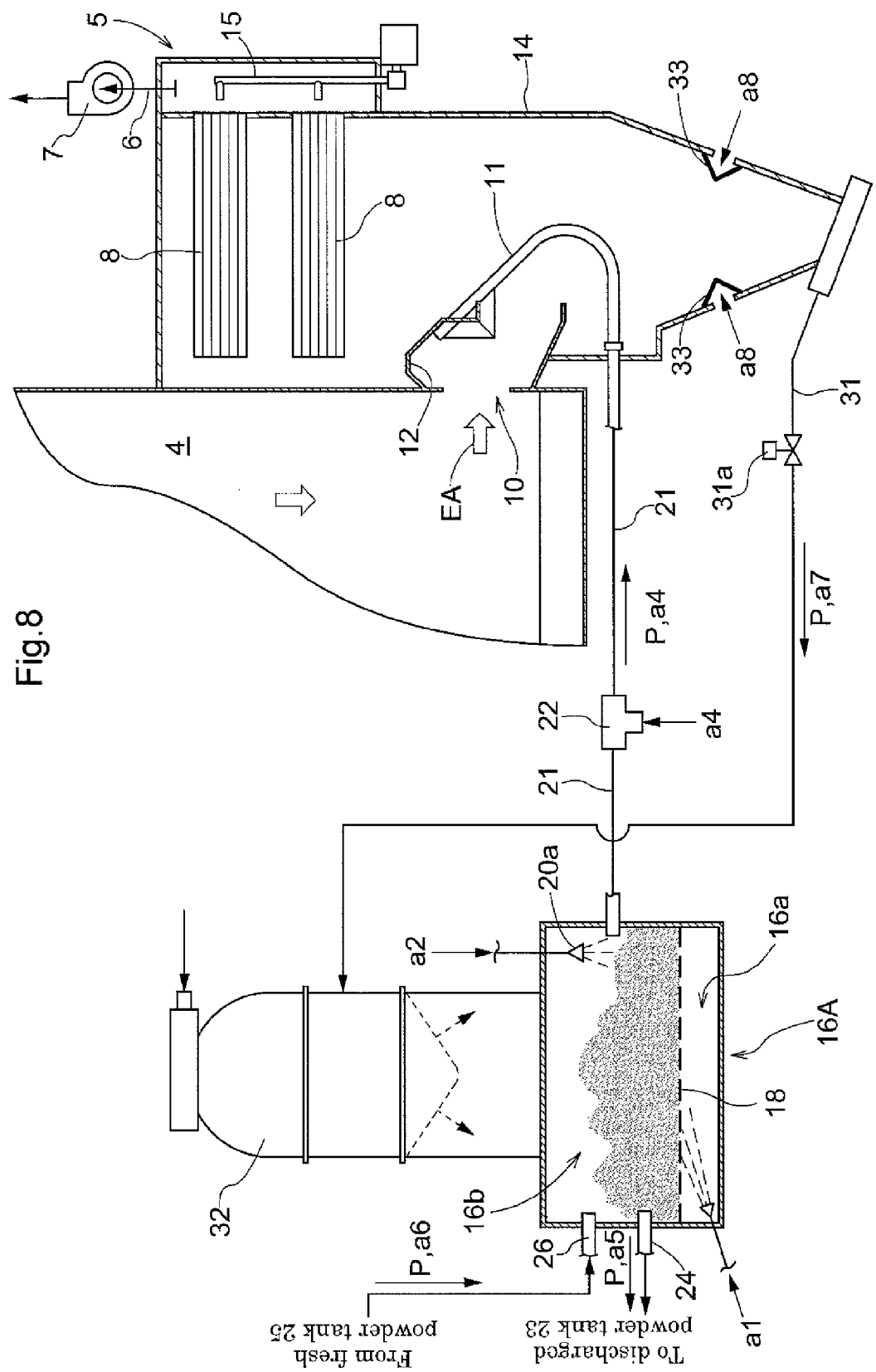
FIG. 8 is a diagram showing a circulation pathway of powder in a third embodiment.
Figure 9:
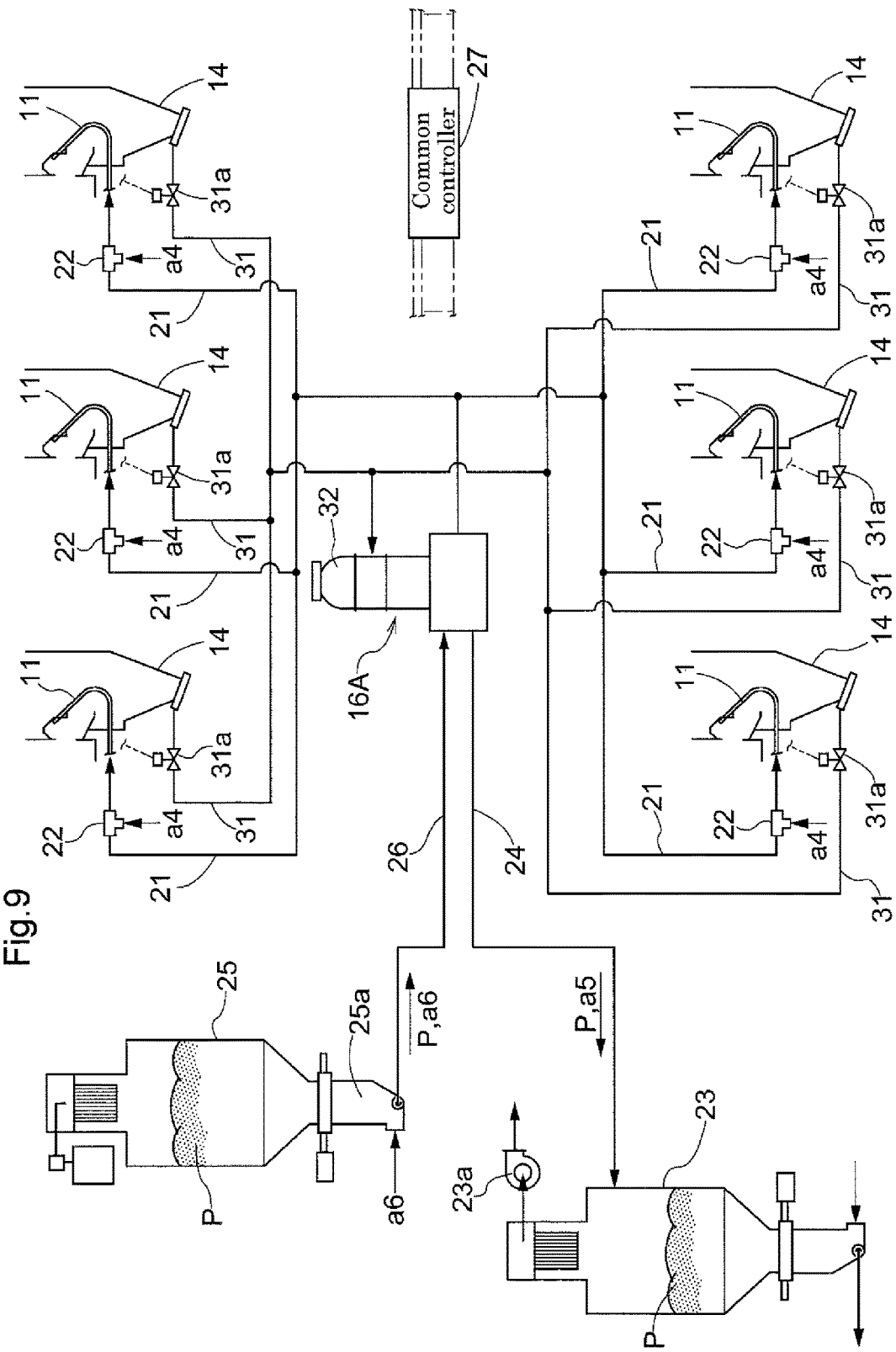
FIG. 9 is a diagram showing a conveyance pathway of fresh powder and discharged powder in the third embodiment.

In the case where multiple coating mist collection apparatuses, in which fresh powder P is supplied to multiple filter apparatuses 5 from one fresh powder tank 25, and powder P containing the coating mist is recovered from the multiple filter apparatuses 5 into one discharged powder tank 23, are provided in a line as shown in FIGS. 5, 7, and 9 in the above embodiments, a powder conveying relay system such as that shown below may be used to convey the recovered powder P in the discharged powder tanks 23 of each of the coating mist collection apparatuses to a disposal location (e.g., a disposal tank).

Specifically, the powder conveying relay system may be a powder relay conveying system that includes multiple powder feeding units that feed powder and multiple relay tanks that individually receive and temporarily store powder fed from the powder feeding units in parallel, and then supply the powder to a powder supply destination, and is provided with a switching control means that repeatedly and alternatingly switches the operation mode of each of the relay tanks between a powder receiving mode in which powder fed from the powder feeding unit is received in the tank, and a powder supplying mode in which the stored powder in the tank is supplied to the powder supply destination, wherein the number of provided relay tanks is one more than the number of powder feeding units, the switching control means maintains a switching condition according to which only one relay tank among the relay tanks is set to the powder supplying mode, and the other relay tanks are all set to the powder receiving mode in parallel, and a switching condition according to which the next switch is executed before any of the relay tanks in the powder receiving mode reaches a powder full state, and the switching control means successively switches the relay tanks to the powder supplying mode one at a time by, when switching one relay tank among the relay tanks in the powder receiving mode to the powder supplying mode, switching the one relay tank that had been in the powder supplying mode to the powder receiving mode.

In the case of applying the powder conveying relay system in order to convey the recovered powder P in the discharged powder tanks 23 in the coating mist collection apparatuses provided in a line to a disposal location, the discharged powder tank 23 may be the powder feeding unit, and the powder supply destination may be the disposal location.

In the above powder conveying relay system, even when the number of relay tanks is one more than the number of powder feeding units, only one relay tank among the relay tanks is set to the powder supplying mode, and all of the remaining relay tanks are set to the powder receiving mode in parallel, a configuration is possible in which the amount of powder per unit of time that can be supplied when each of the relay tanks is in the powder supplying mode is set higher than the total powder feeding amount per unit of time of feeding from the multiple powder feeding units (in other words, the total powder receiving amount per unit of time of the multiple relay tanks in the powder receiving mode), and the relay tanks are switched to the powder supplying mode one at a time using an appropriate switching timing and appropriate switching order. In this case, it is possible to keep a switching condition according to which the next switch is executed before any of the relay tanks in the powder receiving mode reaches the powder full state, and powder to be fed from the powder feeding units is appropriately fed from the relay tanks to the powder supply destination via any of the relay tanks without any of the relay tanks in the powder receiving mode reaching the powder full state.

Therefore, according to the above powder conveying relay system, it is possible to avoid instability that arises in powder reception and powder supply when the reception of powder in one relay tank and the supply of accumulated powder are performed in parallel. It is also possible to avoid conveyance faults such as clogging of conveyed powder in a merging portion or unbalance in the flow rate in powder merging that easily arise when powder fed from multiple powder feeding units in parallel is merged in the process of being conveyed to a relay tank and is then to be received by a common relay tank. Also, even if powder fed from respective powder feeding units is to be continuously received by a relay tank, compared to a system in which two relay tanks are provided for each powder feeding unit, it is possible to effectively reduce the number of relay tanks needed in the system as a whole, effectively reduce the system cost, reduce the size of the system and amount of installation space needed by the system, and effectively reduce the burden in relay tank management.

Note that in the implementation of the above powder conveying relay system, when switching the one relay tank among the relay tanks in the powder receiving mode to the powder supplying mode, the switching of the one relay tank that had been in the powder supplying mode to the powder receiving mode may be performed using any of a switching mode for switching only the connection target powder feeding unit between the relay tank that was switched to the powder supplying mode and the relay tank that was switched to the powder receiving mode so as to maintain the connection target powder feeding unit for the other relay tanks that maintain the powder receiving mode, and a switching mode for switching the connection target powder feeding unit between the relay tank that was switched to the powder supplying mode and the relay tank that was switched to the powder receiving mode so as to switch the connection target powder feeding unit for the other relay tanks that maintain the powder receiving mode.

Also, in the implementation of the above powder conveying relay system, the powder supply destination to which powder is to be supplied from the relay tank in the powder supplying mode may be a powder supply destination common to the relay tanks or individual powder supply destinations for each relay tank or each powder feeding unit, or the powder supply destination to which powder is to be supplied from the relay tank in the powder supplying mode may be appropriately switched among multiple powder supply destinations.

Also, in the implementation of the above powder conveying relay system, the switching control means may be configured so as to, at a predetermined set time interval in a time interval range in which none of the relay tanks in the powder receiving mode reach the powder full state, successively switch the multiple relay tanks one at a time to the powder supplying mode in accordance with a predetermined set order.

According to this configuration, the control executed by the switching control means can be merely simple control for switching the operation mode of the relay tanks in accordance with a predetermined time and order, thus making it possible to further reduce the system cost and further reduce the burden in system management in comparison with employing a control mode in which, for example, the accumulated powder amounts of the respective relay tanks are detected, and the operation mode of the relay tanks are switched based on the detection results.

Also, in the implementation of the above powder conveying relay system, a configuration is possible in which a dividing means is provided for dividing the used powder fed from the discharged powder tank 23 into suitable powder and unsuitable powder and feeding the divided suitable powder to any of the fresh powder tanks 25 as recycling powder, and the switching control means uses the dividing means as the powder feeding unit and causes the relay tank in the powder receiving mode to receive the unsuitable powder fed from the dividing means.

In other words, the used powder fed from the discharged powder tank 23 often contains powder clumps in which the coating material is the binding agent, solidified coating material, or other large-diameter foreign objects such as mixed-in pieces, and according to the above configuration, the used powder fed from the discharged powder tank 23 is divided into unsuitable powder and suitable powder considering the large-diameter foreign object to be unsuitable powder, and only the divided suitable powder is considered to be recycling powder, fed to any of the fresh powder tanks 25, and re-used in the fresh powder tanks 25.

In the above configuration, a mode is applied in which the dividing means is used as a powder feeding unit, and the unsuitable powder that is powder fed from the dividing means is conveyed to the powder supply destination using the powder conveying relay system, thus making it possible for the unsuitable powder fed from the dividing means to be conveyed to a predetermined powder supply destination stably and smoothly.

In the configuration for using the dividing means as a powder feeding unit, the switching control means may be configured so as to successively switch the discharged powder tank 23 that is to feed used powder to the dividing means from among the multiple discharged powder tanks 23, or the dividing means may be a sieve, and the sieve may perform a sieving operation on the powder by ultrasonic vibration produced by an ultrasonic vibrator.

Figure 10:
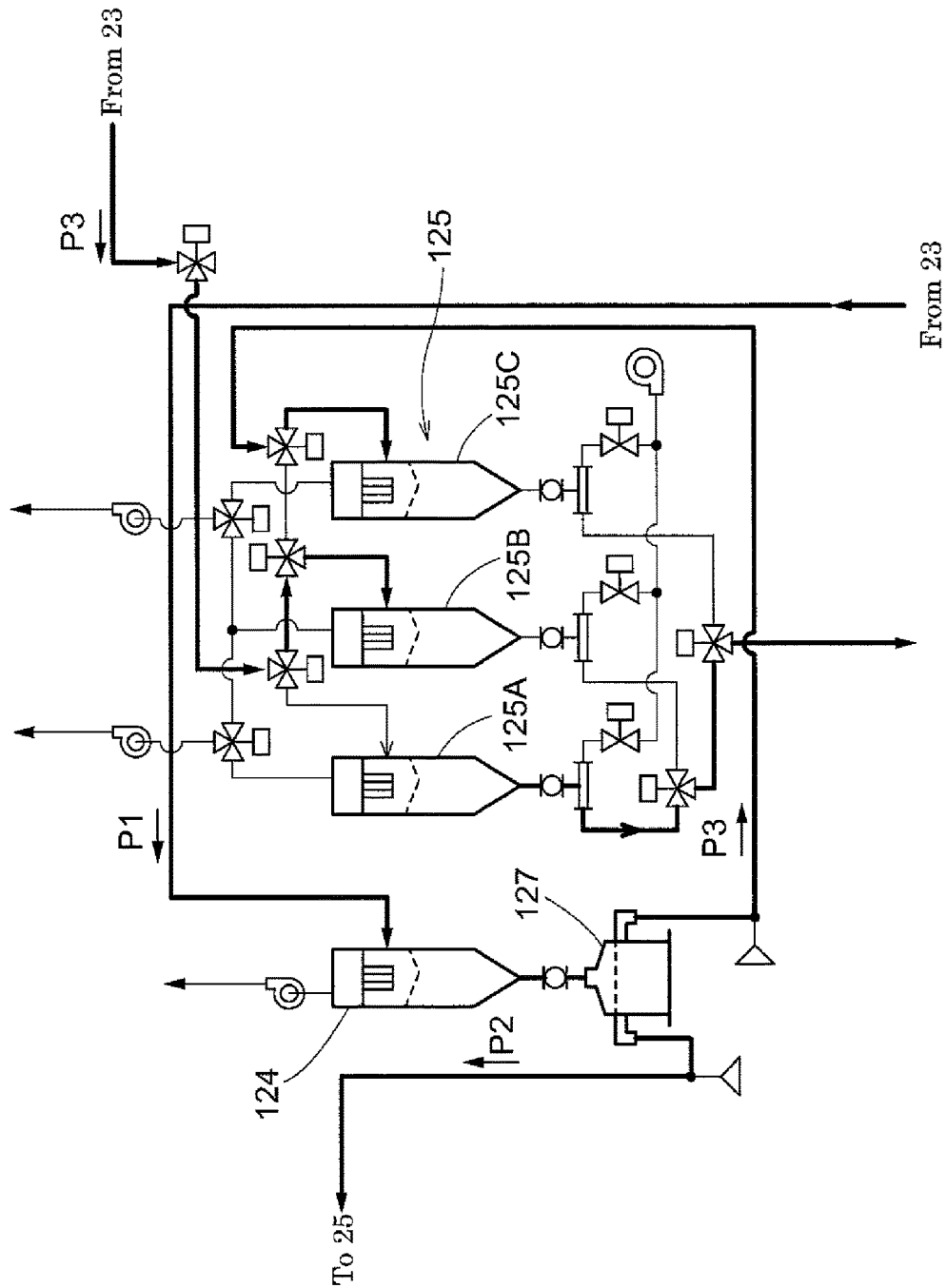
FIG. 10 is a diagram showing a powder relay conveying system.

For example, in two coating mist collection apparatuses provided side-by-side, a powder conveying relay system shown in FIG. 10 may specifically be applied to convey powder P recovered in the discharged powder tanks 23 (i.e., two discharged powder tanks 23) to the disposal location.

The powder conveying relay system shown in FIG. 10 is configured from one dividing tank 124 having a dividing means 127 provided below for dividing supplied powder into recycling powder P2 (suitable powder) and discarding powder P3 (unsuitable powder), and three relay tanks 125 (125A, 125B, and 125C) that temporarily store the discarding powder P3 and then feed it to a disposal location.

One of the two discharged powder tanks 23 supplies the dividing means 127 with used powder P1, and the other one supplies one of the three relay tanks 125 with discarding powder P3. The recycling powder P2 (suitable powder) divided by the dividing means 127 is supplied to the fresh powder tank 25 of one of the two coating mist collection apparatuses provided side-by-side, and the discarding powder P3 (unsuitable powder) divided by the dividing means 127 is supplied to any of the three relay tanks 125.

Specifically, in the powder conveying relay system shown in FIG. 10, one of the two discharged powder tanks 23 and the dividing means 127 are considered to be powder feeding units. As described above, a switching control means (not shown) keeps a switching condition according to which only one relay tank among the relay tanks 125A, 125B, and 125C (only the relay tank 125A in FIG. 10) is set to the powder supplying mode, and all of the other relay tanks (the relay tanks 125B and 125C in FIG. 10) are set to the powder receiving mode in parallel, and keeps a switching condition according to which the next switch is executed before any of the relay tanks in the powder receiving mode (the relay tanks 125B and 125C in FIG. 10) reaches the powder full state. The relay tanks 125A, 125B, and 125C are successively switched to the powder supplying mode one at a time in a mode in which when one relay tank among the relay tanks in the powder receiving mode (the relay tanks 125B and 125C in FIG. 10) is to be switched to the powder supplying mode, the one relay tank that had been in the powder supplying mode (the relay tank 125A in FIG. 10) is switched to the powder receiving mode. Accordingly, the powder P3 fed from one of the discharged powder tanks 23 and the dividing means 127 can be appropriately conveyed to the disposal location via any of the relay tanks.

Note that instead of using the dividing means 127, both of the two discharged powder tanks 23 may be used as powder feeding units for feeding powder to the relay tanks 125. Also, the number of coating mist collection apparatuses provided side-by-side may be three or more, and in that case, the number of relay tanks 125 in the applied powder conveying relay system need only be one more than the number of coating mist collection apparatuses.

DESCRIPTION OF REFERENCE SIGNS

2: coating chamber
EA: processing target air
8: filter
10: air guiding passage
P: powder
11: powder nozzle
16, 16A: powder tank
18: powder dispersion means, air diffusion plate
20a, 20b: powder dispersion means, agitating nozzle
a4: carrier air
21: powder supply passage
22: spray air conveying means, ejector
15: filter regenerating means
14: receiving hopper
14a: powder discharge opening
17: partition door
a5: carrier air
24: powder discharge passage
23a: discharge air conveying means
a6: carrier air
26: fresh powder supply passage
25a: fresh powder air conveying means
30: supply passage switching means
Tk: set recovery time interval
27: control means
a7: carrier air
31: powder reflux passage
32: reflux air conveying means
5: coating mist collection unit
16b: powder storage chamber
a1: agitating air
16a: pressurized air chamber
16c: powder delivery chamber
19: partition wall
19a: diaphragm opening

The invention claimed is:

1. A coating mist collection apparatus comprising:
a filter that collects coating mist contained in processing target air discharged from a coating chamber; and
a powder nozzle that is arranged in an air guiding passage that guides processing target air to the filter, and sprays powder into the processing target air passing through the air guiding passage,
due to the processing target air, wherein the powder sprayed by, the powder nozzle is contained in a dispersed state, being passed through the filter, the coating mist in the processing target gas being collected by the filter in a state wherein a coating mist trapping filter covering layer made up of an accumulated powder layer is formed on a surface of the filter, wherein a powder dispersion apparatus is provided for obtaining a uniform powder concentration in air in a sealed powder tank by dispersing powder stored in the tank in a uniform floating dispersed state, and an ejector is provided for supplying the powder in the floating dispersed state in the powder tank along with carrier air to the powder nozzle through a powder supply passage in parallel with the uniformization of the powder concentration by the powder dispersion apparatus.

2. The coating mist collection apparatus according to claim 1, wherein a filter regenerating apparatus is provided for regenerating the filter by causing the powder containing the coating mist to fall from the surface of the filter, and a receiving hopper is provided for receiving the powder containing the coating mist that falls from the surface of the filter, the powder tank is arranged below the receiving hopper in a state, wherein an interior of the receiving hopper and an interior of the powder tank are in communication with each other through a powder discharge opening formed in a bottom portion of the receiving hopper, and wherein a partition door is provided for opening and closing the powder discharge opening, and due to an opening operation of the partition door, the powder containing the coating mist that has accumulated in the receiving hopper is caused to fall into the powder tank through the powder discharge opening and stored therein, and the powder tank with powder stored therein is sealed by a closing operation of the partition door.

3. The coating mist collection apparatus according to claim 2, wherein a discharge air conveying arrangement is provided for discharging the powder containing the coating mist stored in the powder tank from the powder tank along with carrier air through a powder discharge passage, and a fresh powder air conveying arrangement is provided for supplying fresh powder not containing the coating mist along with carrier air to the powder tank through a fresh powder supply passage.

4. The coating mist collection apparatus according to claim 2, wherein a discharge air conveying arrangement is provided for discharging the powder containing the coating mist stored in the powder tank from the powder tank along with carrier air through a powder discharge passage, a fresh powder air conveying arrangement is provided for supplying fresh powder not containing the coating mist along with carrier air through a fresh powder supply passage, and a valve is provided for switching the supply passage connected to the powder nozzle between the powder supply passage from the powder tank and the fresh powder supply passage.

5. The coating mist collection apparatus according to claim 3, wherein a controller is provided for automatically executing powder recovery wherein, at a set recovery time interval, a partition door is opened and the accumulated powder containing the coating mist in the receiving hopper is caused to fall into the powder tank, and in addition to executing the powder recovery, the controller automatically executes powder refreshing wherein, each time a coating work quantity in the coating chamber reaches a set threshold work quantity, or each time the number of times the partition door has opened reaches a set threshold number of times, the powder containing the coating mist in the powder tank is discharged through the powder discharge passage by the discharge air conveying arrangement, and a predetermined amount of fresh powder is supplied through the fresh powder supply passage by the fresh powder air conveying arrangement.

6. The coating mist collection apparatus according to claim 1, wherein a filter regenerating apparatus is provided for regenerating the filter by causing the powder containing the coating mist to fall from the surface of the filter, and a receiving hopper is provided for receiving the powder containing the coating mist that falls from the surface of the filter, a vacuum apparatus is provided for returning the powder containing the coating mist accumulated in the receiving hopper along with carrier air to the powder tank through a powder reflux passage, a discharge air conveying arrangement is provided for discharging the powder containing the coating mist stored in the powder tank from the powder tank along with carrier air through the powder discharge passage, and a fresh powder air conveying arrangement is provided for supplying fresh powder not containing the coating mist along with carrier air to the powder tank through a fresh powder supply passage.

7. The coating mist collection apparatus according to claim 6, wherein a controller is provided for automatically executing powder recovery wherein, at a set recovery time interval, the accumulated powder containing the coating mist in the receiving hopper is returned to the powder tank by the vacuum apparatus, and in addition to executing the powder recovery, the controller automatically executes powder refreshing wherein, each time a coating work quantity in the coating chamber reaches a set threshold work quantity, or each time the number of times powder has been returned by the vacuum apparatus reaches a set threshold number of times, the powder containing the coating mist in the powder tank is discharged through the powder discharge passage by the discharge air conveying arrangement, and a predetermined amount of fresh powder is supplied to the powder tank through the fresh powder supply passage by the fresh powder air conveying arrangement.

8. The coating mist collection apparatus according to claim 7, wherein when a coating target object processing count in the coating chamber reaches a set threshold processing count, the controller determines that the coating work quantity in the coating chamber has reached the set threshold work quantity, and executes the powder refreshing.

9. The coating mist collection apparatus according to claim 7, wherein the controller sets a powder load value corresponding to a coating target object coating condition in the coating chamber for each coating target object coating task, and integrates the powder load value in the coating target object coating task as coating target objects are successively coated, and when the integrated value of the powder load value has reached a set threshold integrated value, the controller determines that the coating work quantity in the coating chamber has reached the set threshold work quantity, and executes the powder refreshing.

10. The coating mist collection apparatus according to claim 9, wherein the controller sets the powder load value based on any one of the type of coating target object, the type of coating material used on the coating target object, the type of coating task performed on the coating target object, and the coating target object coating location, or a combination of two or more of any of these.

11. The coating mist collection apparatus according to claim 6,
wherein a plurality of coating mist collection units are provided that each include the filter, the powder nozzle, and the receiving hopper, and wherein the powder tank that is provided is common to the plurality of coating mist collection units, and
each of the coating mist collection units is provided with the ejector for supplying powder from the common powder tank to the powder nozzle through the powder supply passage and the vacuum apparatus for returning the powder containing the coating mist from the receiving hopper to the common powder tank through the powder reflux passage.

12. The coating mist collection apparatus according to claim 1,
wherein an air diffusion plate formed by an air-permeable material that allows the passage of pressurized air is arranged in a bottom portion of the powder tank, due to the air diffusion plate, an interior of the powder tank is partitioned into an upper powder storage chamber in which powder is stored and a lower pressurized air chamber that receives a supply of pressurized agitating air, and an agitating nozzle is provided for ejecting agitating air into the powder storage chamber, and
using the air diffusion plate and the agitating nozzle as the powder dispersion apparatus, agitating air is ejected upward from the pressurized air chamber toward the powder storage chamber through the air diffusion plate, and agitating air is ejected from the agitating nozzle into the powder storage chamber such that the powder stored in the powder storage chamber is dispersed in a uniform floating dispersed state.

13. The coating mist collection apparatus according to claim 12,
wherein a powder delivery chamber is provided adjacent to the powder storage chamber in the powder tank, and the powder supply passage extends from the powder delivery chamber, and
a partition wall that divides the powder storage chamber and the powder delivery chamber is provided with a diaphragm opening that, as a connecting opening for putting the powder storage chamber and the powder delivery chamber in communication, limits the amount of inflow of powder flowing from the powder storage chamber to the powder delivery chamber in the floating dispersed state.

14. The coating mist collection apparatus according to claim 1,
wherein the ejector that supplies powder from the powder tank to the powder nozzle through the powder supply passage is configured by an ejector that sucks in powder from the powder tank using negative pressure obtained along with a passage of supplied compressed air, and then using the compressed air resulting from negative pressure as carrier air, supplies the sucked in powder along with the compressed air resulting from negative pressure, and
a spray amount adjustment arrangement is provided for, by adjusting the amount of compressed air supplied to the ejector, adjusting the amount of powder supplied to the powder nozzle and adjusting the spray amount of powder sprayed from the powder nozzle.

* * * * *